US012621293B2

(12) United States Patent
Rojas

(10) Patent No.: US 12,621,293 B2
(45) Date of Patent: *May 5, 2026

(54) SYSTEMS AND METHODS FOR PEER-TO-PEER SINGLE USE ACCESS TOKEN

(71) Applicant: AXS Group LLC, Los Angeles, CA (US)

(72) Inventor: Michael J. Rojas, North Canton, OH (US)

(73) Assignee: AXS Group LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/827,356

(22) Filed: Sep. 6, 2024

(65) Prior Publication Data

US 2024/0430256 A1     Dec. 26, 2024

Related U.S. Application Data

(63) Continuation-in-part of application No. 18/178,749, filed on Mar. 6, 2023, now Pat. No. 12,231,569.

(51) Int. Cl.
| | |
|---|---|
| *H04L 9/08* | (2006.01) |
| *H04L 9/40* | (2022.01) |
| *G06K 7/14* | (2006.01) |

(52) U.S. Cl.
CPC ........ *H04L 63/0846* (2013.01); *G06K 7/1417* (2013.01)

(58) Field of Classification Search
CPC .......................... H04L 63/0846; G06K 7/1417
See application file for complete search history.

(56) References Cited

U.S. PATENT DOCUMENTS

| | | | |
|---|---|---|---|
| 3,622,995 A | 11/1971 | Dikes et al. | |
| 5,999,095 A | 12/1999 | Earl et al. | |

(Continued)

FOREIGN PATENT DOCUMENTS

| | | |
|---|---|---|
| CN | 101025806 A | 8/2007 |
| CN | 101299286 A | 11/2008 |

(Continued)

OTHER PUBLICATIONS

Tripathi, A., Algorithms for validating E-tickets in mobile computing environment, Dec. 20, 2007.

(Continued)

*Primary Examiner* — Normin Abedin
(74) *Attorney, Agent, or Firm* — Knobbe, Martens, Olson & Bear LLP

(57) ABSTRACT

A system of enhancing biometric analysis matching utilizes an image sensor, such as a digital camera, to capture an image of a face of a person. The system may perform image enhancement, such as edge and contrast enhancement, prior to performing face matching. The enhancement may be localized to a given image region based on determined region illumination. The system may perform image processing and analysis comprising face detection, alignment, feature extraction, and recognition. A biometric recognition confidence indicator may be generated using the results of the image enhancement and analysis. At least partly in response to the biometric recognition confidence indicator falling below a threshold enhancing recognition confidence using an image of visual indicia captured using the image sensor.

24 Claims, 7 Drawing Sheets

(56) References Cited

U.S. PATENT DOCUMENTS

| | | | |
|---|---|---|---|
| 6,496,809 | B1 | 12/2002 | Nakfoor |
| 6,685,093 | B2 | 2/2004 | Challa et al. |
| 6,842,741 | B1 | 1/2005 | Fujimura |
| 6,854,651 | B2 | 2/2005 | Smith et al. |
| 7,146,645 | B1 | 12/2006 | Hellsten |
| 7,454,361 | B1 | 11/2008 | Halavais |
| 7,693,744 | B2 | 4/2010 | Forbes |
| 8,346,580 | B2 | 1/2013 | Nakfoor |
| 8,676,615 | B2 * | 3/2014 | Callaghan .......... G06Q 30/0643 |
| | | | 348/222.1 |
| 8,775,807 | B1 | 7/2014 | Vazquez |
| 9,070,231 | B1 | 6/2015 | Meyers |
| 9,147,191 | B2 | 9/2015 | Cohen et al. |
| 9,153,082 | B2 | 10/2015 | Martinez |
| 9,197,313 | B2 | 11/2015 | Delpuch |
| 9,600,946 | B1 | 3/2017 | Gerace et al. |
| 9,697,650 | B2 | 7/2017 | Nakfoor |
| 9,876,788 | B1 | 1/2018 | Ziraknejad |
| 9,898,880 | B2 | 2/2018 | Nagisetty |
| 10,109,125 | B1 | 10/2018 | Gerace et al. |
| 10,163,105 | B1 | 12/2018 | Ziraknejad |
| 10,460,538 | B1 | 10/2019 | Gerace et al. |
| 10,643,209 | B2 | 5/2020 | Cohen et al. |
| 10,867,460 | B1 | 12/2020 | Miller |
| 10,878,648 | B1 | 12/2020 | Gerace et al. |
| 10,891,562 | B1 | 1/2021 | Gerace et al. |
| 11,200,306 | B1 | 12/2021 | Singh |
| 11,397,949 | B2 | 7/2022 | Cohen et al. |
| 11,501,586 | B1 | 11/2022 | Rojas |
| 11,521,449 | B1 | 12/2022 | Gerace et al. |
| 11,531,743 | B2 | 12/2022 | Rojas et al. |
| 11,611,552 | B2 | 3/2023 | Backlund |
| 2001/0051915 | A1 | 12/2001 | Ueno |
| 2002/0169876 | A1 | 11/2002 | Curie |
| 2003/0047613 | A1 | 3/2003 | Funamoto et al. |
| 2003/0105964 | A1 | 6/2003 | Brainard |
| 2003/0110239 | A1 | 6/2003 | Sugumoto et al. |
| 2003/0164400 | A1 | 9/2003 | Boyd |
| 2003/0171960 | A1 | 9/2003 | Skinner |
| 2003/0182242 | A1 | 9/2003 | Scott |
| 2003/0229790 | A1 | 12/2003 | Russell |
| 2004/0006497 | A1 | 1/2004 | Nestor et al. |
| 2004/0035925 | A1 | 2/2004 | Wu et al. |
| 2005/0021364 | A1 | 1/2005 | Nakfoor |
| 2005/0105734 | A1 | 5/2005 | Buer |
| 2006/0089919 | A1 | 4/2006 | Kidd |
| 2006/0101507 | A1 | 5/2006 | Camenisch |
| 2007/0061590 | A1 | 3/2007 | Boye |
| 2007/0226055 | A1 | 9/2007 | Belanger |
| 2008/0015983 | A1 | 1/2008 | Spikes |
| 2009/0171682 | A1 | 7/2009 | Dixon et al. |
| 2009/0188983 | A1 | 7/2009 | Walker |
| 2009/0198617 | A1 | 8/2009 | Soghoian |
| 2009/0294539 | A1 | 12/2009 | Kim |
| 2009/0328207 | A1 | 12/2009 | Patel |
| 2010/0023553 | A1 | 1/2010 | Gausman |
| 2010/0082491 | A1 | 4/2010 | Rosenblatt |
| 2010/0198626 | A1 | 8/2010 | Cho |
| 2011/0105154 | A1 | 5/2011 | Kim |
| 2011/0117966 | A1 | 5/2011 | Coppinger |
| 2011/0119743 | A1 | 5/2011 | Gleim |
| 2011/0208418 | A1 | 8/2011 | Looney et al. |
| 2011/0251862 | A1 | 10/2011 | DeLuca |
| 2011/0281652 | A1 | 11/2011 | Laverdiere |
| 2011/0282725 | A1 | 11/2011 | Chatterjee |
| 2012/0091202 | A1 | 4/2012 | Cohen |
| 2012/0185695 | A1 | 7/2012 | Shah |
| 2012/0197797 | A1 | 8/2012 | Grigg |
| 2012/0214515 | A1 | 8/2012 | Davis |
| 2012/0323691 | A1 | 12/2012 | McLaughlin |
| 2013/0024218 | A1 | 1/2013 | Fink |
| 2013/0085834 | A1 | 4/2013 | Witherspoon, Jr. |
| 2013/0090939 | A1 | 4/2013 | Robinson |
| 2013/0096961 | A1 | 4/2013 | Owens |
| 2013/0185816 | A1 | 7/2013 | Maeda |
| 2013/0262163 | A1 | 10/2013 | Bergdale et al. |
| 2013/0304521 | A1 | 11/2013 | Aird |
| 2013/0325523 | A1 | 12/2013 | Huang |
| 2014/0039945 | A1 | 2/2014 | Coady |
| 2014/0049373 | A1 | 2/2014 | Troy |
| 2014/0100896 | A1 | 4/2014 | Du et al. |
| 2014/0164029 | A1 | 6/2014 | Kwak |
| 2014/0172707 | A1 | 6/2014 | Kuntagod |
| 2014/0222531 | A1 | 8/2014 | Jacobs |
| 2014/0240350 | A1 | 8/2014 | Chen |
| 2014/0240469 | A1 | 8/2014 | Lee |
| 2014/0258530 | A1 | 9/2014 | Potterat |
| 2015/0004935 | A1 | 1/2015 | Fu |
| 2015/0057837 | A1 | 2/2015 | Moore, Jr. |
| 2015/0088420 | A1 | 3/2015 | Foster |
| 2015/0142483 | A1 | 5/2015 | Bergdale |
| 2015/0172920 | A1 | 6/2015 | Ben Ayed |
| 2015/0317466 | A1 | 11/2015 | Kumar |
| 2016/0260031 | A1 | 9/2016 | Pace et al. |
| 2016/0294727 | A1 | 10/2016 | Varghese |
| 2016/0316367 | A1 * | 10/2016 | Rose ........................ H04B 5/77 |
| 2017/0329777 | A1 | 11/2017 | Vlugt |
| 2017/0358148 | A1 | 12/2017 | Kayhani |
| 2020/0090143 | A1 | 3/2020 | Lervolino |
| 2020/0143022 | A1 | 5/2020 | Frost |
| 2020/0209917 | A1 | 7/2020 | Zhou |
| 2020/0294173 | A1 | 9/2020 | Shah |
| 2020/0320576 | A1 | 10/2020 | Harrison |
| 2020/0380229 | A1 | 12/2020 | Peruch |
| 2021/0037003 | A1 | 2/2021 | Volini et al. |
| 2021/0090082 | A1 | 3/2021 | Cohen |
| 2021/0174373 | A1 | 6/2021 | Nakagawa |
| 2021/0216893 | A1 | 7/2021 | Roden |
| 2021/0344672 | A1 * | 11/2021 | Drechsler .............. G06Q 20/02 |
| 2021/0357893 | A1 | 11/2021 | Kang |
| 2022/0014526 | A1 * | 1/2022 | Burgess .............. H04L 63/0861 |
| 2022/0079439 | A1 | 3/2022 | Heislop |
| 2022/0245224 | A1 * | 8/2022 | Rojas ................... G06V 40/117 |
| 2022/0253755 | A1 * | 8/2022 | Cocanougher ........ H04W 12/47 |
| 2023/0105214 | A1 | 4/2023 | Rojas et al. |
| 2023/0179421 | A1 * | 6/2023 | Rojas ........................ H04L 63/08 |
| | | | 713/168 |

FOREIGN PATENT DOCUMENTS

| | | | |
|---|---|---|---|
| CN | 103415858 | B | 3/2018 |
| DE | 100 34 275 | A1 | 1/2002 |
| EP | 1831839 | B2 | 3/2013 |
| JP | 2001-256513 | A | 9/2001 |
| JP | 2001-319186 | A | 11/2001 |
| JP | 2002-109343 | A | 4/2002 |
| JP | 2002-123730 | A | 4/2002 |
| JP | 2002-344444 | A | 11/2002 |
| JP | 2004-295650 | A | 10/2004 |
| KR | 10-2003-0022630 | A | 3/2003 |
| KR | 10-2004-0021165 | A | 3/2004 |
| KR | 10-0592411 | B1 | 6/2006 |
| WO | WO 94/10658 | | 5/1994 |
| WO | WO 2012/096749 | A2 | 7/2012 |

OTHER PUBLICATIONS

Balaban, D. (2005). German football charges forward with e-ticketing. Card Technology, 10(10), 18-22. Retrieved from https://dialog.proquest.com/professional/docview/198546689?accountid=131444 (Year: 2005).

Canadian Preliminary Review regarding Canadian Application No. 2577118, dated Jan. 25, 2019, 12 pages.

European Office Action, from EP Application No. 11855858.4, dated Oct. 4, 2019.

Final Office Action for U.S. Appl. No. 14/272,170, dated Oct. 4, 2017, 26 pages.

Final Office Action for U.S. Appl. No. 15/434,631, dated Jan. 18, 2018, 40 pages.

Haitao Pu, "Quick Response Barcode Deblurring via Doubly Convolution Neural Network," Mar. 10, 2018, Multimedia Tools Applications 78, pp. 897-912 (Year: 2018).

(56)                    References Cited

OTHER PUBLICATIONS

International Preliminary Report on Patentability and Written Opinion of the International Searching Authority for PCT/US2011/064807, "Mobile Application Bar Code Identification and System", dated Jul. 26, 2013, 5 pages.
International Search Report and Written Opinion dated Mar. 27, 2024, received in International Patent Application No. PCT/US2023/081951, in 12 pages.
Karaiskos et al., "User Acceptance of Pervasive Information Systems: Evaluating an RFID Ticketing System", ECIS 2007 Proceedings. 4, retrieved from https://aisel.aisnet.org/cgi/viewcontent.cgi?article=1192&context=ecis2007 (Year: 2007).
Notification of Transmittal of the International Search Report and the Written Opinion of the International Searching Authority, or the Declaration for International Application No. PCT/US2011/064807, date of mailing Jul. 24, 2012, 7 pages.
Office Action for U.S. Appl. No. 14/272,170, dated Sep. 9, 2016, 41 pages.
Office Action for U.S. Appl. No. 14/272,170, dated Mar. 30, 2017, 31 pages.
Office Action for U.S. Appl. No. 14/281,483, dated Jun. 7, 2016, 26 pages.
Office Action for U.S. Appl. No. 15/434,631 dated Jul. 13, 2017, 44 pages.
Supplementary European Search Report for EP Application No. 11855858.4; dated Mar. 29, 2017; Flash Seats, LLC; 9 pages.

* cited by examiner

SECTION A, ROW C, SEATS 1, 2

TOKEN EXPIRES AT 12:15PM

SYSTEMS AND METHODS FOR PEER-TO-PEER SINGLE USE ACCESS TOKEN

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure is generally related to access tokens and in particular to peer-to-peer provision of access tokens.

Description of the Related Art

User devices, such as smartphones, are increasingly used to provide access tokens for physical access to a physical location. However, in order for a user device to be used as an access device, typically an application needs to be downloaded to the smartphone and a user needs to login to a pre-established account. Disadvantageously, if cell service or WiFi service are unavailable or are already overutilized, it may not be possible to download the application or it may take an inordinate amount of time to download such an application. This situation may result in the user either unable to gain access to the physical location or having to wait an inordinate amount of time to gain access.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to a computer-implemented method of electronically generating a time-limited one-use access token, the method comprising: receiving, at a computer system from a user at a first venue of a first event, a request, for a one-use optical token; receiving at the computer system an electronic address from the user at the first venue of the first event, the electronic address purported to be associated with an access right acquired remote from the first venue for the first event at the first venue; performing a search of a database for a record associated with the electronic address; at least partly in response to identifying a first record associated with the electronic address, determining if the first record is associated with the access right for the first event; at least partly in response to determining the first record is associated with the access right for the first event, generating a token comprising a computer readable optical code comprising a device identifier, a user identifier, and a timestamp; determining an expiration time associated with the token comprising the computer readable optical code comprising the device identifier, the user identifier, and the timestamp, wherein the computer readable optical code does not include a ticket, a venue identifier, or an event identifier; determining a seat associated with the first record; while the first user is at the venue, transmitting, using a messaging service to the electronic address, the expiration time, a seat identifier corresponding to the seat associated with the first record, the token, the token comprising the computer readable optical code comprising the device identifier, the user identifier, and the timestamp, wherein the electronic address is accessible by a first device of the first user; reading using a first optical reader, from a display of the first device, the token comprising the computer readable optical code comprising the device identifier and the user identifier; determining whether the device identifier and the user identifier correspond to that in the first record; and at least partly in response to determining that the device identifier and the user identifier correspond to that in the first record, transmitting a command causing an access granted indicator to be presented by a first venue device.

Optionally, the first optical reader is located at a perimeter access point, the method further comprising: reading using a second optical reader, located at an interior access point of the venue, the token comprising the computer readable optical code comprising the device identifier and the user identifier; determining whether the device identifier and the user identifier correspond to that in the first record; and at least partly in response to determining that the device identifier and the user identifier correspond to that in the first record, transmitting a command causing an access granted indicator to be presented by a second venue device located at or proximate to the interior access point of the venue.

Optionally, the first optical reader is located at a perimeter access point, the method further comprising: determining, for a second user associated with a mobile communication device, that a user identifier and/or device identifier are not available from a second user record; generating a second computer readable optical code comprising: a second timestamp, a mock mobile identifier having a mobile identifier format different than the mobile identifier of the mobile communication device; a mock user identifier having a user identifier format; generating a dummy record comprising the mock mobile identifier and the mock user identifier; reading using a given venue optical reader, from a display of the mobile communication device associated with the second user, the second computer readable optical code comprising the mock device identifier and the mock user identifier; determining whether the mock device identifier and the mock user identifier correspond to that in the dummy record; and at least partly in response to determining that the mock device identifier and the mock user identifier correspond to that in the dummy record, transmitting a second command causing a second access granted indicator to be presented by a given venue device.

Optionally, the first optical reader is located at a perimeter access point, the method further comprising: reading using a second optical reader, located at an interior access point of the venue, a second token comprising a second computer readable optical code comprising a second device identifier and a second user identifier; determining whether the second token had been read by the first optical reader, wherein the first optical reader is located at the perimeter access point; and at least partly in response to determining that the second token has not been read by the first optical reader, causing an access denied indicator to be presented by a second venue device located at the interior access point of the venue.

Optionally, the token comprising the computer readable optical code comprising the device identifier, the user identifier, and the timestamp further comprises error correction implemented using a Bose-Chaudhuri-Hocquenghem code.

Optionally, determining the expiration time associated with the token comprising the computer readable optical code comprising the device identifier, the user identifier, and the timestamp, further comprises: accessing a first threshold time period from memory; and summing the first threshold time with the timestamp to provide the expiration time.

Optionally, the method further comprises: determining an estimated traversal time from a first location at the venue to a second location at the venue; and wherein the timestamp is determined at least partly based on a current time and the estimated traversal time from the first location at the venue to the second location at the venue.

Optionally, the method further comprises receiving the electronic address from a kiosk having a display and user input device configured to receive identification information comprising an email address and/or a phone number directly from the user.

An aspect of the present disclosure relates to a system, the system comprising: a computing device; and non-transitory computer readable memory that stores instructions that when executed by the computing device cause the system to perform operations comprising: receive from a user at a first venue of a first event, a request, for a one-use optical token; receive an electronic address from the user at the first venue of the first event, the electronic address purported to be associated with an access right acquired remote from the first venue for the first event at the first venue; perform a search of a data store for a record associated with the electronic address; at least partly in response to identifying a first record associated with the electronic address, determine if the first record is associated with the access right for the first event; at least partly in response to determining the first record is associated with the access right for the first event, generate a token comprising a computer readable optical code comprising a device identifier and/or a user identifier, and a timestamp; determine an expiration time associated with the token comprising the computer readable optical code comprising the device identifier and/or the user identifier, and the timestamp, wherein the computer readable optical code does not include a ticket, a venue identifier, or an event identifier;

while the first user is at the venue, transmitting to the electronic address, the expiration time, the token, the token comprising the computer readable optical code comprising the device identifier and/or the user identifier, and the timestamp, wherein the electronic address is accessible by a first device of the first user; read using a first optical reader, from a display of the first device, the token comprising the computer readable optical code comprising the device identifier and/or the user identifier; determining whether the device identifier and/or the user identifier correspond to that in the first record; and at least partly in response to determining that the device identifier and/or the user identifier correspond to that in the first record, transmit a command causing an access granted indicator to be presented by a first venue device.

Optionally, the first optical reader is located at a perimeter access point, the operations further comprise: reading using a second optical reader, located at an interior access point of the venue, the token comprising the computer readable optical code comprising the device identifier and the user identifier; determining whether the device identifier and the user identifier correspond to that in the first record; and at least partly in response to determining that the device identifier and the user identifier correspond to that in the first record, transmitting a command causing an access granted indicator to be presented by a second venue device located at or proximate to the interior access point of the venue.

Optionally, the first optical reader is located at a perimeter access point, the operations further comprise: determining, for a second user associated with a mobile communication device, that a user identifier and/or device identifier are not available from a second user record; generating a second computer readable optical code comprising: a second timestamp, a mock mobile identifier having a mobile identifier format different than the mobile identifier of the mobile communication device; a mock user identifier having a user identifier format; generating a dummy record comprising the mock mobile identifier and the mock user identifier; reading using a given venue optical reader, from a display of the mobile communication device associated with the second user, the second computer readable optical code comprising the mock device identifier and the mock user identifier; determining whether the mock device identifier and the mock user identifier correspond to that in the dummy record; and at least partly in response to determining that the mock device identifier and the mock user identifier correspond to that in the dummy record, transmitting a second command causing a second access granted indicator to be presented by a given venue device.

Optionally, the first optical reader is located at a perimeter access point, the operations further comprise: reading using a second optical reader, located at an interior access point of the venue, a second token comprising a second computer readable optical code comprising a second device identifier and a second user identifier; determining whether the second token had been read by the first optical reader, wherein the first optical reader is located at the perimeter access point; and at least partly in response to determining that the second token has not been read by the first optical reader, causing an access denied indicator to be presented by a second venue device located at the interior access point of the venue.

Optionally, the token comprising the computer readable optical code comprising the device identifier and/or the user identifier, and the timestamp further comprises error correction implemented using a Bose-Chaudhuri-Hocquenghem code.

Optionally, determining the expiration time associated with the token comprising the computer readable optical code comprising the device identifier and/or the user identifier, and the timestamp, further comprises: accessing a first threshold time period from memory; and summing the first threshold time with the timestamp to provide the expiration time.

Optionally, the operations further comprise: determining an estimated traversal time from a first location at the venue to a second location at the venue; and wherein the timestamp is determined at least partly based on a current time and the estimated traversal time from the first location at the venue to the second location at the venue.

Optionally, the computer system is configured to communicate with a kiosk having a display and user input device configured to receive identification information comprising an email address and/or a phone number directly from the user.

An aspect of the present disclosure relates to non-transitory computer readable memory that stores instructions that when executed by a computing system cause the computing system to perform operations comprising: receive from a user at a first venue of a first event, a request, for an optical token; receive an electronic address from the user at the first venue of the first event, the electronic address purported to be associated with an access right acquired remote from the first venue for the first event at the first venue; perform a search of a data store for a record associated with the electronic address; at least partly in response to identifying a first record associated with the electronic address, determine if the first record is associated with the access right for the first event; at least partly in response to determining the first record is associated with the access right for the first event, generate a token comprising a computer readable optical code comprising a device identifier and/or a user identifier, and a timestamp; determine expiration information associated with the token comprising the computer readable optical code comprising the device identifier and/or the user identifier, and the timestamp, wherein the computer readable optical code does not include a ticket, a venue identifier, or an event identifier; while the first user is at the venue, transmitting, using a messaging service to the electronic address, the expiration information, the token, the token comprising the computer readable optical code comprising the device identifier and/or the user identifier, and the timestamp, wherein the electronic address is accessible by a first device of the first user; read using a first optical reader, from a display of the first device, the token comprising the computer readable optical code comprising the device identifier and/or the user identifier; determining whether the device identifier and/or the user identifier correspond to that in the first record; and at least partly in response to determining that the device identifier and/or the user identifier correspond to that in the first record, transmit a command causing an access granted indicator to be presented by a first venue device.

Optionally, the first optical reader is located at a perimeter access point, the operations further comprise: reading using a second optical reader, located at an interior access point of the venue, the token comprising the computer readable optical code comprising the device identifier and the user identifier; determining whether the device identifier and the user identifier correspond to that in the first record; and at least partly in response to determining that the device identifier and the user identifier correspond to that in the first record, transmitting a command causing an access granted indicator to be presented by a second venue device located at or proximate to the interior access point of the venue.

Optionally, the first optical reader is located at a perimeter access point, the operations further comprise: determining, for a second user associated with a mobile communication device, that a user identifier and/or device identifier are not available from a second user record; generating a second computer readable optical code comprising: a second timestamp, a mock mobile identifier having a mobile identifier format different than the mobile identifier of the mobile communication device; a mock user identifier having a user identifier format; generating a dummy record comprising the mock mobile identifier and the mock user identifier; reading using a given venue optical reader, from a display of the mobile communication device associated with the second user, the second computer readable optical code comprising the mock device identifier and the mock user identifier; determining whether the mock device identifier and the mock user identifier correspond to that in the dummy record; and at least partly in response to determining that the mock device identifier and the mock user identifier correspond to that in the dummy record, transmitting a second command causing a second access granted indicator to be presented by a given venue device.

Optionally, the first optical reader is located at a perimeter access point, the operations further comprise: reading using a second optical reader, located at an interior access point of the venue, a second token comprising a second computer readable optical code comprising a second device identifier and a second user identifier; determining whether the second token had been read by the first optical reader, wherein the first optical reader is located at the perimeter access point; at least partly in response to determining that the second token has not been read by the first optical reader, causing an access denied indicator to be presented by a second venue device located at the interior access point of the venue.

Optionally, the token comprising the computer readable optical code comprising the device identifier and/or the user identifier, and the timestamp further comprises error correction implemented using a Bose-Chaudhuri-Hocquenghem code.

Optionally, determining the expiration information associated with the token comprising the computer readable optical code comprising the device identifier and/or the user identifier, and the timestamp, further comprises: accessing a first threshold time period from memory; and summing the first threshold time with the timestamp to provide an expiration time.

Optionally, the operations further comprise: determining an estimated traversal time from a first location at the venue to a second location at the venue; wherein the timestamp is determined at least partly based on a current time and the estimated traversal time from the first location at the venue to the second location at the venue.

Optionally, the electronic address is received via a kiosk having a display and user input device configured to receive identification information comprising an email address and/or a phone number directly from the user.

An aspect of the present disclosure relates to computer-implemented method of electronically generating a time-limited one-use access token comprising encrypted and/or hashed identifiers, the method comprising: receiving, at a computer system from a user at a venue of a first event, a request, for a one-use optical token; receiving at the computer system an electronic address from the user at the venue of the first event, the electronic address purported to be associated with an access right acquired remote from the venue for the first event at the venue; performing a search of a database for a record associated with the electronic address; at least partly in response to identifying a first record associated with the electronic address, determining if the first record is associated with the access right for the first event; at least partly in response to determining the first record is associated with the access right for the first event, generating a token comprising a computer readable optical code comprising a device identifier, a user identifier, and a timestamp wherein the device identifier and the user identifier are encrypted using a first key; determining an expiration time associated with the token comprising the computer readable optical code comprising the device identifier, the user identifier, and the timestamp, wherein the device identifier and the user identifier are encrypted using the first key, and wherein the readable optical code does not include a ticket, a venue identifier, or an event identifier; determining a seat associated with the first record; while the first user is at the venue, transmitting, using a messaging service to the electronic address, the expiration time, a seat identifier corresponding to the seat associated with the first record, the token, the token comprising the computer readable optical code comprising the device identifier, the user identifier, and the timestamp wherein the device identifier and the user identifier are encrypted using the first key, wherein the electronic address is accessible by a first device of the first user; reading using an optical reader, from a display of the first device, the token comprising the computer readable optical code comprising the device identifier and the user identifier, wherein the device identifier and the user identifier are encrypted using the first key; decrypting, using a second key, the encrypted device identifier and the user identifier; and determining whether the decrypted device identifier and the user identifier correspond to that in the first record; and at least partly in response to determining that the decrypted device identifier and the user identifier correspond to that in the first record, transmitting a command causing an access granted indicator to be presented by a venue device.

Optionally, determining whether the decrypted device identifier and the user identifier correspond to that in the first record further comprises comparing a hash of the decrypted device identifier and the user identifier with a hash of a device identifier and a user identifier accessed from the first record.

Optionally, the token comprising the computer readable optical code comprising the device identifier, the user identifier, and the timestamp further comprises error correction implemented using a Bose-Chaudhuri-Hocquenghem code.

Optionally, the method further comprises determining, from the timestamp, whether the token has expired after the token has been read by the optical reader.

Optionally, the first device comprises a mobile phone.

Optionally, the method further comprises: providing a credentials application for download to a second user device associated with a second user, the credentials application configured to generate a second token comprising a second computer readable optical code comprising a device identifier associated with the second device, a user identifier associated with the second user, and a timestamp; reading using the optical reader, from a display of the second device, the second token comprising the second computer readable optical code comprising the device identifier associated with the second device, a user identifier associated with the second user, and the timestamp; decrypting the encrypted device identifier associated with the second device and the user identifier associated with the second user; determining whether the device identifier associated with the second device and the user identifier associated with the second user correspond to that in a second record; and at least partly in response to determining that the decrypted device identifier associated with the second device and the user identifier associated with the second user correspond to that in the first record, transmitting a command causing a second access granted indicator to be presented by the venue device.

Optionally, the method further comprises: determining an estimated traversal time from a first location at the venue to a second location at the venue; wherein the timestamp is determined at least partly based on a current time and the estimated traversal time from the first location at the venue to the second location at the venue.

Optionally, the computer system comprises a kiosk having a display and user input device configured to receive the electronic device directly from the user.

An aspect of the present disclosure relates to system, the system comprising: a computing device; and non-transitory computer readable memory that stores instructions that when executed by the computing device cause the system to perform operations comprising: receive from a user at a venue of a first event, a request, for a one-use optical token; receive an electronic address from the user at the venue of the first event, the electronic address purported to be associated with an access right acquired remote from the venue for the first event at the venue; perform a search of a data store for a record associated with the electronic address; at least partly in response to identifying a first record associated with the electronic address, determine if the first record is associated with the access right for the first event; at least partly in response to determining the first record is associated with the access right for the first event, generate a token comprising a computer readable optical code comprising a device identifier, a user identifier, and a timestamp; determine an expiration time associated with the token comprising the computer readable optical code comprising the device identifier, the user identifier, and the timestamp, wherein the readable optical code does not include a ticket, a venue identifier, or an event identifier; while the first user is at the venue, transmit, using a messaging service to the electronic address, the expiration time, a seat identifier corresponding to the seat associated with the first record, the token, the token comprising the computer readable optical code comprising the device identifier, the user identifier, and the timestamp; read using an optical reader, from a display of the first device, the token comprising the computer readable optical code comprising the device identifier, the user identifier, and the timestamp; determine whether the device identifier and the user identifier correspond to that in the first record; at least partly in response to determining that the device identifier and the user identifier correspond to that in the first record, transmit a command causing an access granted indicator to be presented by a venue device.

Optionally, determining whether the device identifier and the user identifier correspond to that in the first record further comprises comparing a hash of the device identifier and the user identifier with a hash of a device identifier and a user identifier accessed from the first record.

Optionally, the token comprising the computer readable optical code comprising the device identifier and the user identifier, further comprises error correction implemented using a Bose-Chaudhuri-Hocquenghem code.

Optionally, the operations further comprise determining, from the timestamp, whether the token has expired after the token has been read by the optical reader.

Optionally, the first device comprises a mobile phone.

Optionally, the operations further comprise: provide a credentials application for download to a second user device associated with a second user, the credentials application configured to generate a second token comprising a second computer readable optical code comprising a device identifier associated with the second device, a user identifier associated with the second user, and a timestamp; read using the optical reader, from a display of the second device, the second token comprising the second computer readable optical code comprising the device identifier associated with the second device, a user identifier associated with the second user, and the timestamp; determine whether the device identifier associated with the second device and the user identifier associated with the second user correspond to that in a second record; and at least partly in response to determining that the device identifier associated with the second device and the user identifier associated with the second user correspond to that in the first record, transmit a command causing a second access granted indicator to be presented by the venue device.

Optionally, the operations further comprise: determine an estimated traversal time from a first location at the venue to a second location at the venue, wherein the timestamp is determined at least partly based on a current time and the estimated traversal time from the first location at the venue to the second location at the venue.

An aspect of the present disclosure relates to a non-transitory computer readable memory that stores instructions that when executed by a computing system cause the computing system to perform operations comprising: receive from a user at a venue of a first event, a request, for a one-use optical token; receive an electronic address from the user at the venue of the first event, the electronic address purported to be associated with an access right acquired remote from the venue for the first event at the venue; perform a search of a data store for a record associated with the electronic address; at least partly in response to identifying a first record associated with the electronic address, determine if the first record is associated with the access right for the first event; at least partly in response to determining the first record is associated with the access right for the first event, generate a token comprising a computer readable optical code comprising a device identifier, a user identifier, and a timestamp; while the first user is at the venue, transmit, using a messaging service to the electronic address, a seat identifier corresponding to the seat associated with the first record, the token, the token comprising the computer readable optical code comprising the device identifier, the user identifier, and the timestamp; read using an optical reader, from a display of the first device, the token comprising the computer readable optical code comprising the device identifier, the user identifier, and the timestamp;

determine whether the device identifier and the user identifier correspond to that in the first record; at least partly in response to determining that the device identifier and the user identifier correspond to that in the first record, transmit a command causing an access granted indicator to be presented by a venue device.

Optionally, the operations further comprise: determine an expiration time associated with the token comprising the computer readable optical code comprising the device identifier, the user identifier, and the timestamp; and transmit the expiration time to the electronic address.

Optionally, determining whether the device identifier and the user identifier correspond to that in the first record further comprises comparing a hash of the device identifier and the user identifier with a hash of a device identifier and a user identifier accessed from the first record.

Optionally, the token comprising the computer readable optical code comprising the device identifier and the user identifier, further comprises error correction implemented using a Bose-Chaudhuri-Hocquenghem code.

Optionally, the operations further comprise determining, from the timestamp, whether the token has expired after the token has been read by the optical reader.

Optionally, the first device comprises a mobile phone.

Optionally, the operations further comprise: provide a credentials application for download to a second user device associated with a second user, the credentials application configured to generate a second token comprising a second computer readable optical code comprising a device identifier associated with the second device, a user identifier associated with the second user, and a timestamp; read using the optical reader, from a display of the second device, the second token comprising the second computer readable optical code comprising the device identifier associated with the second device, a user identifier associated with the second user, and the timestamp; determine whether the device identifier associated with the second device and the user identifier associated with the second user correspond to that in a second record; at least partly in response to determining that the device identifier associated with the second device and the user identifier associated with the second user correspond to that in the first record, transmit a command causing a second access granted indicator to be presented by the venue device.

Optionally, the operations further comprise: determine an estimated traversal time from a first location at the venue to a second location at the venue, wherein the timestamp is determined at least partly based on a current time and the estimated traversal time from the first location at the venue to the second location at the venue.

BRIEF DESCRIPTION OF THE DRAWINGS

Aspects will now be described with reference to the drawings summarized below. These drawings and the associated description are provided to illustrate example aspects of the disclosure, and not to limit the scope of the invention.

DETAILED DESCRIPTION

Figure 1A:
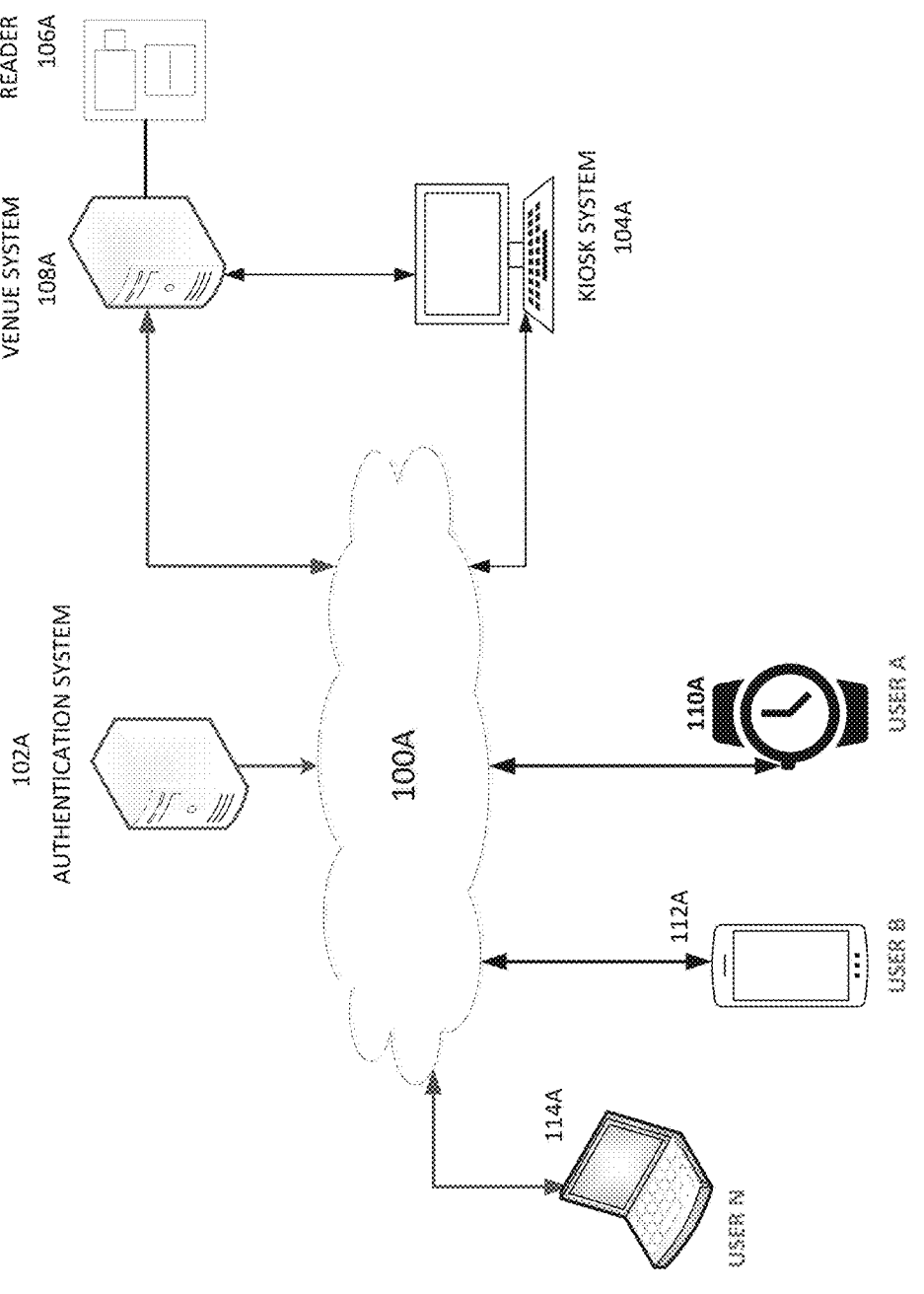
FIG. 1A illustrates an example networked environment architecture.

An aspect of the present disclosure relates to systems and methods configured to provide a single use, time limited token, where the token may be configured to access a physical location. Such a token may be utilized to obviate the need to download a dedicated application (e.g., which may be referred to as a credentials app) to access the physical location, which is particularly advantageous in locations where wireless networks are heavily loaded and application downloads would be very slow. Certain aspects of the present disclosure relate to providing cryptographic security (e.g., via encryption and/or hashing) via corresponding cryptographic processes.

To better understand the advantages of certain aspects of the disclosed techniques, an example process of utilizing a downloaded application (a credentials app) to access a physical location, such as an event venue hosting a ticketed event, will now be described.

An electronic device may be utilized to identify a user using a downloaded application (e.g., an application, which may be referred to as a credentials app, provided via an application store or otherwise by a ticket service that sells tickets to events). For example, using a downloaded application, a user mobile device (e.g., a mobile phone) may present one or more unique identifiers (e.g., a unique user device identifier (e.g., a Mobile ID) and/or a unique user identifier, and/or a hash value thereof) to an access control device (e.g., a barcode reader/scanner) at a venue.

The identifiers may be assigned by an authentication system and/or may be assigned by a device manufacturer/provider (e.g., a phone or SIM card provider, such as an IMEI (International Mobile Equipment Identity) identifier, an MEID (Mobile Equipment IDentifier) identifier, an ESN (Electronic Serial Number) identifier, an IMSI (International Mobile Subscriber Identity) identifier, etc.). Thus, the device identifier may be different than a phone number associated with a mobile phone. Such user and/or device identifiers may be presented to the access control device by the mobile device, via the downloaded application, using optical indicia (e.g., a one or two dimensional barcode, such as a QR code, and/or characters, presented by the credentials app on the mobile device's display), a wireless electromagnetic transmission, or via an audio signal.

Such identifiers may optionally be encrypted prior to transmission and/or presentation by the downloaded credentials application hosted on the mobile device. The identifiers may be encoded with a timestamp, as similarly discussed elsewhere herein. Where the identifier(s) and timestamp are presented via an optical code, the optical code may be periodically re-generated (e.g., every 5, 10, 15, 20, or 30 seconds, or somewhere in the range of 5 seconds to 5 or 10 minutes) to include an updated timestamp. This prevents someone taking a screenshot of the optical indicia and sharing it for later use, as the timestamp will be too old. Examples of using electronic user devices in verifying a user has access rights to a ticketed event at a venue are described elsewhere herein.

Optionally, the optical codes discussed herein (e.g., 1 dimensional barcodes or 2 dimensional barcodes (e.g., QR codes)) may be configured to enable reading/scanning errors to be detected and corrected. For example, such errors may be introduced by dirt, smudges, or user fingers obscuring the optical code (e.g., displayed on a user's mobile device). The error correction may optionally be implemented by adding a Bose-Chaudhuri-Hocquenghem code, such as a Reed-Solomon Code, or other error correction code, to the original data being encoded into an optical code. The number of Reed-Solomon Code codewords added may correspond to the number of codewords that may need to be corrected (e.g., the number of Reed-Solomon Code codewords added may be twice the number of codewords that may need to be corrected).

In certain configurations, an application (a credentials app) may need to be downloaded to a user device (e.g., via an app store) and a user may need to log into a user account via the application in order for the application to be configured with one or more identifiers (e.g., a Mobile ID, such as described elsewhere herein, a unique member ID personal to the user (e.g., a 32, 64, 96, 129, or 256 alpha numeric identifier), and/or other identifier). For example, a user may need to log in to the application, the application may then need to contact a remote server, and the remote server may then configure the application with one or more of the disclosed device and/or user identifiers (or the application may be self-configuring where it directly accesses a unique identifier from the mobile device and/or receives a user identifier, which may or may not be unique, from the user). Such a setup process can be network intensive and time consuming, particularly where wireless networks are heavily loaded and network transactions (e.g., application downloads) are slow.

Once downloaded and set up, the credentials app may be utilized at a venue in identifying the user and in determining that the user has access rights (e.g., a ticket) to a ticketed event at a venue. For example, when at the venue and attempting to gain admission to the ticketed event, the user may open the credentials app on the user's mobile device. The credentials app may then generate a token, such as an optical code that may encode one or more of the identifiers and a timestamp. Optionally, a unique member ID, a unique device identifier, and/or the timestamp may be encrypted and/or hashed or otherwise cryptographically secured, and then encoded into a token (e.g., a barcode, such as a QR code, and/or characters). The token may be displayed on a user device display. The displayed token may then be read/scanned by a token reader (e.g., a barcode reader) at a physical location at the venue (e.g., at an entryway).

As similarly discussed elsewhere herein, the token may be periodically regenerated by the credentials app hosted on the user's mobile device to include a new, current timestamp reflecting the current time. Thus, the mobile device, via the application app, locally creates and displays an optical code (e.g., a barcode) unique to the mobile device user. The token (e.g., a barcode) optionally is not based on data solely related to or even partially related to the venue or event such as, location name, address, event title, performance name, event session/showing, etc. In this way, the token (e.g., the barcode) is independent of venue data and event data (and does not include any data identifying the venue or event), and the user does not need to have an electronic ticket for the event stored on the user's mobile device (although optionally, an electronic ticket for the event is stored on the user's mobile device). Thus, the token (e.g., the barcode) may be self-generated by the downloaded credentials application hosted on the user device, rather than being generated by a remote system.

By way of further illustration, a user may acquire access rights to an event at a physical venue. For example, a user may purchase event tickets via a ticketing website hosted by one or more servers (e.g., via the authentication system described elsewhere herein). The servers in turn may record the ticket purchase in a database in a user account record. The user account record may store one or more device identifiers associated with a user device and/or a unique user identifier (e.g., a Member ID). Optionally, a hash of the identifiers may be stored in the user record or the hash may be generated when needed to perform an authentication/verification process. By way of illustration, a hashing operation may be performed to map the user identifier and the device identifier to a hash value of a fixed length. Advantageously, it may be very difficult to reverse hash the hash value to obtain the user identifier and the device identifier. Optionally, the hashing operations described herein may utilize MD5 (that encodes information into a 128-bit fingerprint), SHA-2 (comprising SHA-224, SHA-256, SHA-384, SHA-512, SHA-512/224, SHA-512/256 hash functions with digests (hash values) that are 224, 256, 384 or 512 bits in length), CRC32 (a cyclic redundancy check error-detecting code), and/or other hashing function.

The ticket may provide the user with a right to attend a venue at a certain date, time, and/or for a certain event. The ticket may grant the user a right to a certain seat or area in the venue or event. When the user presents the device with the displayed token to a venue reader/scanner, a venue system or remote authentication system may authenticate the user and ensure that user is authorized to access the venue and/or event at the current time and/or for the current event.

For example, the venue reader/scanner device may read/scan and decode the contents of the token to obtain the user ID, the device identifier, and the timestamp (which may optionally be in UTC date/time). The reader/scanner or other system may compare the timestamp against the current time and determine whether the timestamp has expired or satisfied (is within) a threshold date/time range (e.g., the current time plus 15 seconds, 30 seconds, 1 minutes, 2 minutes, 3 minutes, 4 minutes, 5 minutes, or other time range). If the date/time has expired, a command may be issued to a visual indicator (e.g., a device display, an LED light, etc.) to indicate that authentication has failed. This process helps ensure that a user may not simply capture a screenshot of the token optical code and provide the screenshot to others to thereby enable the screenshot recipients to access the ticketed event.

If the date/time has not expired, the decoded user device identifier and/or user identifier may be utilized to determine if there are matching results for the device identifier and/or user identifier in the database (e.g., a matching user record). For example, the device identifier and user identifier or a hash value thereof may be compared to device identifiers and user identifiers or a hash value thereof in the database. If a match is not found, a command may be issued to a visual indicator (e.g., a device display, an LED light, etc.) to indicate that authentication has failed.

If a match is found, a determination may be made as to whether access rights to the venue/event are associated with the user record (e.g., whether the user purchased and still has a ticket for the event, or whether someone has properly transferred the ticket to the user). If access rights to the venue/event are not associated with the user record, a command may be issued to a visual indicator (e.g., a device display, an LED light, etc.) to indicate that authentication has failed. If access rights to the venue/event are determined to be associated with the user record, a command may be issued to a visual indicator (e.g., a device display, an LED light, etc.) to indicate that authentication/verification has succeeded, and the user may be granted access to the venue/event.

Optionally, rather than comparing a user identifier and/or a device identifier to user identifiers and/or a device identifier in the database, a hash value of a user identifier and/or a device identifier may be compared to a hash value of a user identifier and/or a device identifier in the database. As similarly discussed above, if a matching hash value is not found, a command may be issued to a visual indicator (e.g., a device display, an LED light, etc.) to indicate that authentication has failed.

If a matching hash value is found in a user record, a determination may be made whether access rights to the venue/event are associated with the user record. If access rights (e.g., a ticket) to the venue/event are not associated with the user record a command may be issued to a visual indicator (e.g., a device display, an LED light, etc.) to indicate that authentication has failed. If access rights to the venue/event are associated with the user record, a command may be issued to a visual indicator (e.g., a device display, an LED light, etc.) to indicate that authentication has succeeded, and the user may be granted access to the venue/event (e.g., via a computer-controlled barrier or by a human service person).

However, as similarly discussed above, conventionally the above token generation, scanning, and authentication processes will not be initiated if the user device (e.g., smart phone) does not have the corresponding credentials application installed and if the user has not logged into their account. Disadvantageously, a user arriving at an event may not have installed the application on the user's device. Further disadvantageously, at many venues, the local cell and/or WiFi networks may be heavily loaded by the thousands, tens of thousands, or hundreds of thousands of user devices attempting to access the networks. Therefore, it may take many minutes to download the credentials application, which may be tens or hundreds of megabytes in size, to the user device and for the user to log in to the application. This will delay users from accessing the event/venue and may result in large numbers of users crowding unsafely while waiting for the applications to download. Indeed, such delays may result in users missing parts of the ticketed event.

In order to overcome the foregoing technical problems caused by lack of sufficient cell or WiFi bandwidth, the following technical solution may be utilized. A user that does not have the application downloaded can approach and utilize a computerized interactive kiosk (e.g., comprising a touch screen display, physical keys, a speaker, a microphone, wired and/or wireless network interfaces, and/or the like, which may optionally be mounted on a pedestal or counter and may be positioned to that it is accessible by event attendees) and/or a human service person. The user may then provide identification information (e.g., an email address, and/or phone number) that had been associated with the ticket purchase/acquisition and/or associated with the user's account record. For example, the user may provide an email address and/or mobile phone number associated with the ticket purchase/acquisition in response to a request presented via a user interface at the kiosk or in response to a request by the service person. A database search may be performed to determine if the identification information provided to the kiosk or service person matches that associated with a user record and/or ticket purchase/acquisition (e.g., for a ticketed event at a venue). For example, a database search may be performed for a user record having the identification information (e.g., electronic address, such as a mobile phone number, other messaging address, email address, and/or the like) provided to the kiosk or service person.

Optionally, in addition to determining whether the identification information provided to the kiosk or service person matches that associated with a user record and/or ticket purchase/acquisition, a determination may be made as to whether the user record indicates that the user is entitled to access a restricted area during the event at the event venue (e.g., a VIP area, a lounge, a restricted access seating area, and/or the like).

If a database match is found, a one-time token may be generated (e.g., by a token generation module) and transmitted to an electronic address (e.g., an email address and/or phone number) provided when the ticket was acquired from the ticket service so that the token can be accessed and displayed by the user device to the venue reader/scanner (e.g., via a messaging application or email application). The token may comprise an image (e.g., in the form of a JPEG, PDF, TIFF, BMP, GIF, or other image format) including a static optical code that simulates that produced by the credentials application described herein (e.g., having the same optically coded user identifier and mobile device identifier), except that optionally, the optical code does not regenerate periodically with a new timestamp (in contrast to the token generated by the application, which periodically regenerates).

Advantageously, the transmission of the optical code via a messaging service message (e.g., an SMS/MMS or other message type) or an email utilizes much less network bandwidth than the downloading of a software application (e.g., the credentials application described herein), and hence may require a very short amount of time to be received by the user device (e.g., less than a second, 1-5 seconds, 1-10 seconds, 1-30 seconds, etc.) even where there is heavy network loading. Optionally, the kiosk may print out the token and the user may present the printed token to a venue reader/scanner rather than presenting the token via a user device display. This may be advantageous in the event the user does not have access to a user device or if the user device does not have access to the electronic address associated with the ticket purchase.

Thus, optionally, if there is a record for the user that includes a device identifier (e.g., a unique device identifier) for a device of the user, that device identifier from the user record may be utilized in the optical code. Optionally, if there is a record for the user that includes a user identifier for the user (e.g., a unique user identifier), that user identifier may be utilized in the optical code.

Optionally, if the actual user identifier and/or the actual device identifier are not available via a user record, the optical code may optionally include a timestamp (which may be the current time, or the current time plus an additional time so that the timestamp will expire at a later time), a unique identifier different than the actual mobile identifier (which may be referred to as a mock mobile device identifier) corresponding to a format (e.g., length, use of permitted characters) of a unique mobile device identifier, even though optionally the unique identifier may not actually be that of an actual mobile device (or may correspond to a unique identifier of a device that is no longer is use) to thereby ensure compatibility with the authentication/ticketing system. Similarly, the optical code may optionally include a unique identifier different than an actual user identifier (which may be referred to as a mock user identifier) corresponding to a format (e.g., length, use of permitted characters) of a unique user identifier, even though optionally the unique identifier may not actually be that of an actual user (or may be a user identifier of a user that no longer has an account with the authentication/ticketing system) to thereby ensure compatibility with the authentication/ticketing system.

Optionally, if the optical code does not include the actual user identifier and/or mobile device identifier of the user (and hence may not be able to be used to access the actual user record stored in a database), a "dummy" record may be recorded by the authentication system and/or a venue system that indicates that the holder of the one-use token is entitled to admission to the ticketed event. The dummy record may also indicate what seat and/or entrance the user is entitled to utilize. Optionally, the generated and recorded dummy record may indicate whether the user is entitled to enter a restricted area within the event venue during the event (where the user first needs to gain admission via a perimeter access point to an event venue using the access code, and then uses the access code to enter an restricted area within the venue). Thus, when the optical code is read, a database lookup will locate the corresponding dummy record, and the user will be verified as having access rights accordingly. Optionally, once the one-use token is utilized, the dummy record may be deleted, thereby reducing memory utilization and preventing the one-use token from being utilized a second time. Optionally, the dummy record may be deleted after the scheduled event completion date/time or determined to be completed (e.g., a threshold period of time after the event is scheduled or determined to be completed or at a specified time of day, such as 3 AM the morning after the event).

Optionally, the dummy record and/or real user record may have an indication recorded therein that a given token is not to expire for a given period of time, such as for the day of the corresponding event (e.g., for access to a perimeter access point and/or an internal access point). When the token is later scanned at a given at a corresponding access point, the token will be determined not to have expired as long as the scan time is within the given period of time.

Thus, advantageously, by having the identifiers in the one-use token mimic or be the same as those of the "normal" optical codes presented by the credentials app, the authentication system and/or venue reader/scanner can read and interpret the optical code, and determine that the real (or mock) mobile device identifier, the real (or mock) user identifier, and the timecode entitle the user to admission to the venue for the ticketed event, just as if they were presented via the downloaded credentials application. As with the optical code generated by the credentials application, the generated one-use token (e.g., comprising a barcode) transmitted to the electronic address optionally is not based on data solely related to or even partially related to the venue or event such as, location name, address, event title, performance name, event session/showing, etc. In this way, the one-use token (e.g., the barcode) is independent of venue data and event data (and does not include any data identifying the venue or event). However, in this scenario, the one-use token (e.g., the barcode) is not self-generated by a credentials application, downloaded to and hosted on the user device, and is instead generated by a system separate from and independent of the user device.

As noted above, the static optical code included in the one-use token may optionally include a timestamp. Thus, the static optical code may only be used to gain access for a threshold period of time (e.g., the current time plus 15 seconds, 30 seconds, 1 minutes, 2 minutes, 3 minutes, 4 minutes, 5 minutes, or other time range) after the time after the time in the timestamp. Optionally, the token generation module may determine at what time the token will expire (so that it no longer may be used to gain access to the ticketed event at the venue) by mathematically adding the threshold period of time to the time included in the timestamp (e.g., expiration time=threshold period of time+timestamp). The expiration time may be transmitted to the user's electronic address to inform the user as to how much time the user has to utilize the token before the token expires. Optionally, in addition, the token generation module may determine from the user record a seat assigned to the user. The seat identifier may be transmitted to the user's electronic address in association with the token for display by the user device.

Optionally, the one use token may be used to gain access to both a perimeter access point (e.g., a venue entrance) and at one or more restricted areas (e.g., a VIP area, an area at the front of a stage, and/or the like), such as described elsewhere herein, within the venue during the event that are reached after first passing through a perimeter access point. Optionally, the token may enable a user to obtain access to the interior restricted area for a threshold period of time, wherein the threshold period of time for access to the restricted area is optionally different than the threshold period of time for access to a perimeter access point. For example, the token may enable a user to obtain access to the perimeter access point for a first threshold period of time (e.g., the current time plus 5 minutes, or other time range) may enable a user to obtain access to the interior restricted area for a second threshold period of time (e.g., the current time plus 2 hours, or other time range). Optionally, the token may enable the user to access the interior restricted area multiple times, so that the user can leave the restricted area and then re-use the optical code to regain access to the restricted area. The term "interior" is to indicate that the location is within the perimeter.

Optionally, rather than using the one-use token to both gain access to an event venue perimeter access point and to gain access to an interior access point, two tokens may be generated, one token to access the event venue perimeter access point and one token to access the interior access point, Optionally, the token to access the interior access point may have a timestamp later than the timestamp for the token to access the event venue perimeter access point. Otherwise, the two tokens may optionally include some or all of the same data.

Once the one-use token is utilized to gain access to the event (e.g., via a perimeter access point), a corresponding record of use is optionally stored in a database. If someone attempts to reuse the one-use token by presenting it to a venue reader/scanner, a lookup process will determine that the one-use token is no longer valid, and a command may be issued to a visual and/or audible indicator (e.g., a device display, an LED light, etc.) to indicate that authentication has failed. Similarly, once a one-token is used to access a restricted area within the event venue perimeter, a corresponding record of use is optionally stored in a database. If someone attempts to reuse the one-use token by presenting it to a venue reader/scanner at an access point of the interior restricted location, a lookup process will determine that the one-use token is no longer valid for access to the interior restricted location, and a command may be issued to a visual and/or audible indicator (e.g., a device display, an LED light, etc.) at the restricted area access point to indicate that authentication has failed.

Certain aspects will now be described with reference to the figures.

FIG. 1A illustrates an example networked environment that may be utilized to practice certain example processes herein. An authentication system 102A may communicate via a network 100A (e.g., the Internet, an intranet, a cellular network, and/or other network) with one or more venue systems 108A and/or computerized kiosk systems 104A (which may be mounted on a pedestal or counter and which may be useable directly by event attendees), which may be located at a venue of a ticketed event.

For example, a given venue system 108A may have a corresponding authentication reader 106A (sometimes referred to as a reader or scanner) located at a venue entrance (which may be an entrance to a venue building or may be an entrance within a building to a restricted area). A given authentication reader/scanner 106A may include, by way of example a camera and/or a scanner, and/or other device configured to read a token comprising an optical indicia (such as a barcode (e.g., a 1D or 2D barcode, such as a QR code)), that may include a unique user identifier, a unique device identifier, and/or a timestamp, for authentication purposes. For example, a scanner may direct a beam of light across an optical code and measure the amount and pattern of reflected light to read an optical code, such as a barcode. A given venue system 108A may include a network interface configured to communicate with the authentication system 102A and optionally other systems via the network 100A. Similarly, the kiosk system 104A may include a network interface to communicate with the venue system 108A and/or the authentication system 102A.

The venue system 108A, the authentication reader 106A, and/or the authentication system 102A may execute a hashing process to hash data (e.g., a unique user identifier, a unique mobile device identifier, and/or other data) accessed from a read/scanned token for comparison with data (e.g., a unique user identifier, a unique mobile device identifier, and/or other data) obtained from a user record, hashed via a hashing process, to determine whether a user bearing the token is authorized to access a ticketed event as described elsewhere herein.

The authentication system 102A may store user account information including some or all of the following user-related data: a user name, a user email address, a user mobile phone number/SMS/text messaging address, a user avatar, geographical information (e.g., physical address, zip code, city, etc.), a unique user identifier (e.g., an alphanumeric identifier, fingerprint data, face print data, iris print data, and/or the like), a unique user device identifier (such as device identifiers disclosed elsewhere herein (e.g., an IMEI, MEID, ESN, IMSI and/or system assigned identifier, where the device identifier may optionally be different than and may not include a mobile device phone number)), event identifiers corresponding to events the user has access rights to, user preferences (e.g., favorite performers, favorite venues, favorite musical styles, etc.), and/or other user-related data disclosed herein.

Optionally, a user may be enabled to acquire a plurality of tickets to a given event (e.g., such as when a group will be attending together), and a corresponding record may be stored in the user account, and optionally the same token may be utilized to gain access for a group of attendees at the same time. Optionally, the user may provide an account identifier for each person in the group that has an account with the system 102A or related system, and a corresponding ticket (and associated venue and event access rights) may be associated with the respective person's record (including any biometric identifiers, user identifiers, and/or user device identifiers therein).

The authentication system 102A may optionally store one or more user identifiers, passwords (e.g., textual, alphanumeric user identifiers, such as ones specified by the user, assigned by an electronic system, a user email address, a user phone number, etc.), credentials application serial number, and/or other account access token for a given user. The user identifiers, passwords, credentials application serial number, and/or the account access token may be unique. Optionally, the user identifiers, passwords, credentials application serial number, and/or the account access tokens may not be unique, but a combination or pairing of a user identifier and device identifier may be unique.

The kiosk system 104A may include a display (which may comprise a touch screen), a physical keyboard, a speaker, a microphone, and/or a printer. As similarly discussed elsewhere herein, a user may utilize the kiosk system 104A to obtain a one-use token to gain access to a ticketed event at the venue (e.g., where a user has rights to access the ticketed event, but does not have a credentials application hosted on the user's mobile device). As similarly discussed elsewhere herein, the one-use token (e.g., encoding a real or mock mobile device identifier, a real or mock user identifier, and/or a timecode) may mimic an optical code produced by an application configured to be downloaded to user device for authentication purposes. The one-use token may be transmitted to an electronic address associated with a user and/or a user device (e.g., as an SMS/MMS messaging service message transmitted to a mobile phone number, as an email to an email address, and/or the like), where the electronic address may have been provided or utilized when the corresponding ticket was original acquired. Optionally, the kiosk system 104A may be configured to print the one-use token on a physical media so that a user without a mobile device or without access to the electronic address can use the printed one-use token to access a ticketed event. Thus, although certain examples may refer to generating and/or presenting a one-use token via a mobile device, optionally, the disclosed systems may enable a one-use token to be generated and/or presented via printed media (e.g., via paper, plastic, or other printed media).

User devices 110A, 112A, 114A may be in networked communication with the authentication system 102A. A given user device may optionally have a credentials application downloaded to (e.g., from an application store or via a ticketing website), and executed by the user device. The application may be used to perform ticket searches, ticket purchases (via the authentication system 102A), and/or to present credentials/authentication data, such as the token comprising an optical code as described herein. In addition, a given user device may host a messaging application (e.g., an SMS/MMS, a multiplatform messaging application, and/ or the like), and/or an email application configured to receive messages (e.g., one-use tokens, emails, notifications, and/or the like) from other system described herein, such as the authentication system 102A, the venue system 108A, the kiosk system 104A, and/or other systems. For example, a user device may be configured to receive a one-use token transmitted by one or more of the systems disclosed herein (e.g. The kiosk system 104A). By way of example, a user device may be a computerized mobile device, such as a smartphone, a tablet computer, a laptop computer, a wearable device (e.g., a networked smart watch), a portable game console, or the like.

Figure 1B:
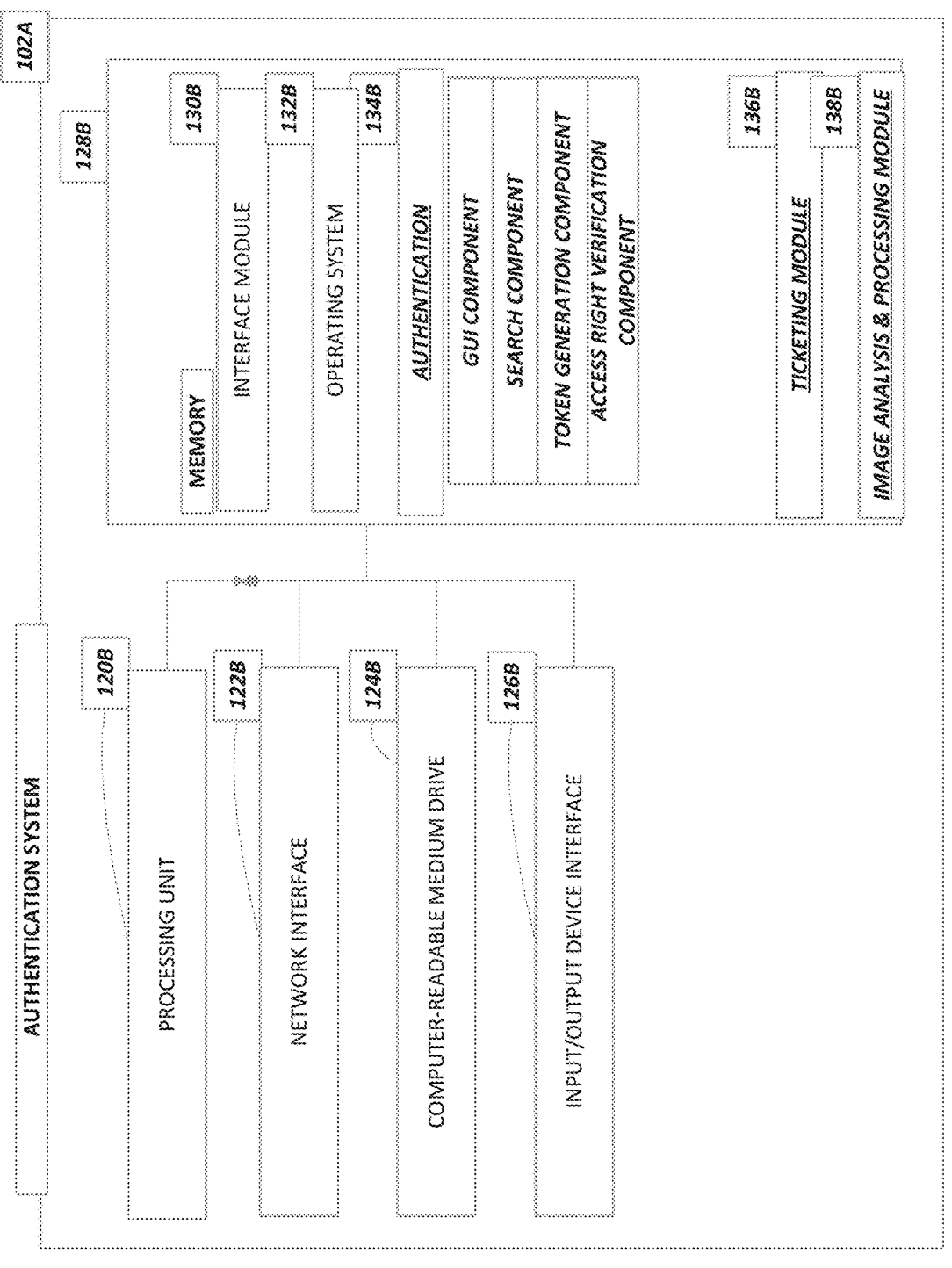
FIG. 1B illustrates an example system architecture.

FIG. 1B is a block diagram illustrating example components of the authentication system 102A. The example authentication system 102A includes an arrangement of computer hardware and software components that may be used to implement aspects of the present disclosure. Those skilled in the art will appreciate that the example components may include more (or fewer) components than those depicted in FIG. 1B. The authentication system 102A may comprise a cloud-based computer system. Optionally, computer hardware and/or software components illustrated in FIG. 1B may be instead or also be included in the venue system 108A and/or the kiosk system 104A.

With respect to the cloud-based computer system implementation, the cloud-based computer system may comprise a hosted computing environment that includes a collection of physical computing resources that may be remotely accessible, located at different facilities, and may be rapidly provisioned as needed (sometimes referred to as a "cloud" computing environment). Certain data described herein may optionally be stored using a data store that may comprise a hosted storage environment that includes a collection of physical data storage devices that may be remotely accessible and may be rapidly provisioned as needed (sometimes referred to as "cloud" storage).

The authentication system 102A may include one or more processing units 120B (e.g., one or more general purpose processors and/or high speed graphics processors), one or more network interfaces 122B, a non-transitory computer-readable medium drive 124B, and an input/output device interface 126B, all of which may communicate with one another by way of one or more communication buses. The network interface 124B may provide services described herein with connectivity to one or more networks or computing systems (e.g., venue systems/kiosk systems, user devices, event promoters, seating chart visualization systems, etc.). The processing unit 120B may thus receive information (e.g., verification/authentication data (e.g., biometric data, user identifiers, device identifiers, etc.), verification/authentication requests, etc.) and/or instructions from other computing devices, systems, or services via a network, and may provide responsive data and/or execute instructions. The processing unit 120B may also communicate to and from memory 124B and further provide output information via the input/output device interface 126B. The input/output device interface 126B may also accept input from one or more input devices, such as a keyboard, mouse, digital pen, touch screen, microphone, camera, etc.

The memory 128B may contain computer program instructions that the processing unit 120B may execute in order to implement one or more aspects of the present disclosure. The memory 128B generally includes RAM, ROM (and variants thereof, such as EEPROM) and/or other persistent or non-transitory computer-readable storage media. An interface module 130B may provide access to data in the memory 120B and may enable data to be stored in the memory 120B. The memory 120B may store an operating system 132B that provides computer program instructions for use by the processing unit 120B in the general administration and operation of a biometric authentication module 134B, including its components.

The memory 128B may store user account records, including a user name, a user email address, a user phone number/SMS/text messaging address, geographical information (e.g., physical address, zip code, city, etc.) one or more unique or non-unique user identifiers (e.g., an alphanumeric identifier, fingerprint data, face print data, iris print data, gait data, and/or the like, such as described elsewhere herein), one or more unique or non-unique user device identifier, event identifiers corresponding to events the user has access rights to, seat identifiers corresponding to seats assigned to the user at the corresponding events, access identifiers corresponding to locations that the user has access rights to within a venue for a corresponding event, hashes of user device and/or user identifiers, user preferences (e.g., favorite performers, favorite venues, favorite musical styles, other preferences discussed herein, and/or the like), payment instrument data, and/or other user data described herein. The memory 128B may store may also store event, access token, and venue information, such as discussed elsewhere herein. In addition, the memory 128B may optionally store mock records, such as those described herein, that entitle a user of a one-use token to access a ticketed event at a venue.

The memory 128B may optionally store threshold periods of time with respect to access to perimeter access points for event venues and/or store threshold periods of time with respect to access to interior event venue access points for restricted areas within the event venue. For example, as described elsewhere herein, a timestamped access token may expire when a current time is earlier than the timestamp time plus the corresponding threshold period of time.

Some or all of the data and content discussed herein may optionally be stored in a relational database, an SQL database, a NOSQL database, or other database type. Because the content elements may include BLOBs (binary large objects), such as large images (e.g., still photographs (e.g., of biometric features), videos (e.g., of biometric features), multilayered graphics, etc.) which may be difficult for a conventional database to handle, some (e.g., BLOBs) or all of the content elements may be stored in files and corresponding references may be stored in the database. Optionally, the memory 128B may include one or more third party cloud-based storage systems.

The authentication module 134B may include a GUI component that generates graphical user interfaces and processes user inputs and a search component (which may include a search engine used to search for ticketed events). The authentication module 134B may also include a multi-factor authentication component configured to identify and authenticate users. As discussed herein, the identification/ authentication may be performed by comparing a hash of a unique user identifier and a unique device identifier with that generated by the system 102A. By way of further example, the authentication may be performed by decrypting data (e.g., using a private key or the key used to perform encryption) comprising a unique user identifier and/or a unique device identifier, and comparing the decrypted data with that stored by the authentication system 102A. Optionally Advanced Encryption Standard (AES), a symmetric encryption algorithm that encrypts fixed blocks of data (of 628 bits) at a time, may be used. By way of further example, optionally Rivest-Shamir-Adleman (RSA) encryption/decryption techniques may be utilized. By way of yet further example, optionally triple DES (Data Encryption Standard) encryption/decryption techniques may be utilized. By way of yet further example, a hash function may be utilized. Optionally, in addition or instead, authentication may be performed using biometric readings of a user (e.g., iris data, fingerprint data, face data, etc.).

An access right verification component may be configured to determine whether an identified/authenticated user has an associated right to access an event at a venue (and/or a portion of an event venue). For example, the access right verification component may be configured to determine whether an identified user has a ticket to an event at a venue on a given date and/or time, for a given seat or seating area (e.g., by accessing a record corresponding to the identified user and determining if there is an access right indication for the identified user for the event at the current date/time).

A ticketing module 136B may be configured to enable users to view information regarding ticketed events, access event venue seating charts, view available and unavailable event venue seats, access images of a view from a given seat, view access ticket prices, create a user account (optionally including some or all of the user account information discussed herein), purchase or otherwise obtain one or more access rights (e.g., access tokens/tickets) to the event, store an indication of access rights obtained by the user, and/or recommend events to the user (e.g., using the user's preferences, access token acquisition history, geographical location, event sponsorship, and/or the like).

An image analysis and processing module 138B may be configured to perform image analysis (e.g., on optical indicia encoding encrypted authentication data, on images of biometric features (e.g., iris, face, finger, etc.), etc.), perform contrast enhancement, deblurring, and/or image rotation to thereby enhance the decoding and decryption of images of optical indicia (e.g., barcodes captured using a camera device) and/or of biometric features.

Figure 2:
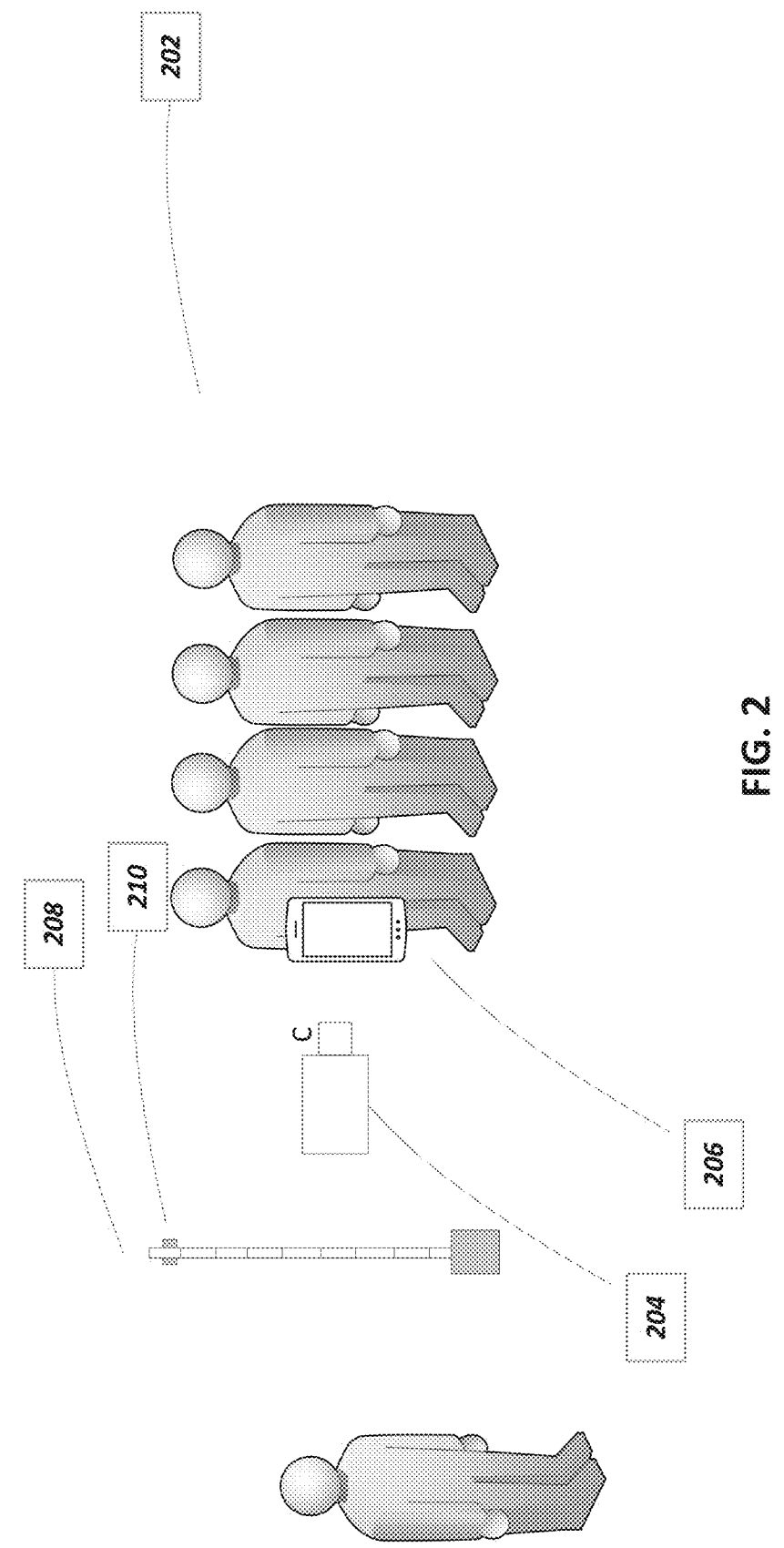
FIG. 2 illustrates an example venue admission area configuration.

FIG. 2 illustrates an example venue authentication configuration. Attendees 202 at a ticketed event may be queued or otherwise waiting at a venue entry point for admission. A reader/scanner 204 may be positioned to capture images of or read optical authentication data (e.g., one or two dimensional barcodes, such as a QR code, encoding a user identifier, a device identifier, and/or a timestamp) from a user device 206. The reader/scanner 204 may include a barcode scanner that directs a beam of light (e.g., via one or more LEDs) across the barcode, measures the amount and pattern of the reflected light, converts the light energy into data by a decoder, and transmits the data to a computer, such as the venue system 108A and/or the authentication system 102A). In addition or instead, the reader/scanner 204 may include a camera (e.g., that captures an image of the barcode, converts the barcode to data and transmits the data to a computer, such as the venue system 108A and/or the authentication system 102A). The venue entrance may optionally be configured with a barrier 208 (e.g., a turnstile or gate). The barrier 208 may be computer controlled and may be unlocked and/or opened (e.g., using an electric motor, a solenoid, and/or other actuator) in response to identifying an attendee and/or in response to verifying that the attendee has access rights to enter the venue for an event at the current time.

The images and/or data from the reader/scanner 204 (or data derived from information captured by the reader/scanner 204) may be transmitted to an authentication system, such as authentication system 102A and/or venue system 108A, for identification and/or to determine whether the attendee has access rights to the venue (e.g., for an event at the current time). The authentication system 102A may transmit data to a device 210 at the venue indicating whether the attendee has access rights.

The device 210 may display a visual and/or audible indication indicating whether or not the attendee has access rights to the event. If a determination is made that the user is not to be granted access to the event, optionally the device 210 may be instructed by one or more of the disclosed systems to display the reason for the denial (e.g., no matching user record found, the user record is not associated with a ticket to the event, the access token has expired, and the like). The device 210 may comprise a portable handheld device (e.g., held by venue personnel that controls access to the venue) and/or may comprise a fixed display/light indicator (e.g., mounted to a stand, the barrier 208, a wall, or otherwise). The device 210 may be combined with a reader/scanner, such as the reader/scanner 204 as a single, integrated device. For example, the device 210 may comprise one or more indicator lights (e.g., red and/or green LED lights) and/or a flat panel display configured to indicate whether the user of the device 206 should be granted admission to the venue for the ticketed event, or whether the user should be denied entry (e.g., in response to a failure to authenticate the user and/or to a failure to verify the user has a valid ticket for the event).

Figure 3:
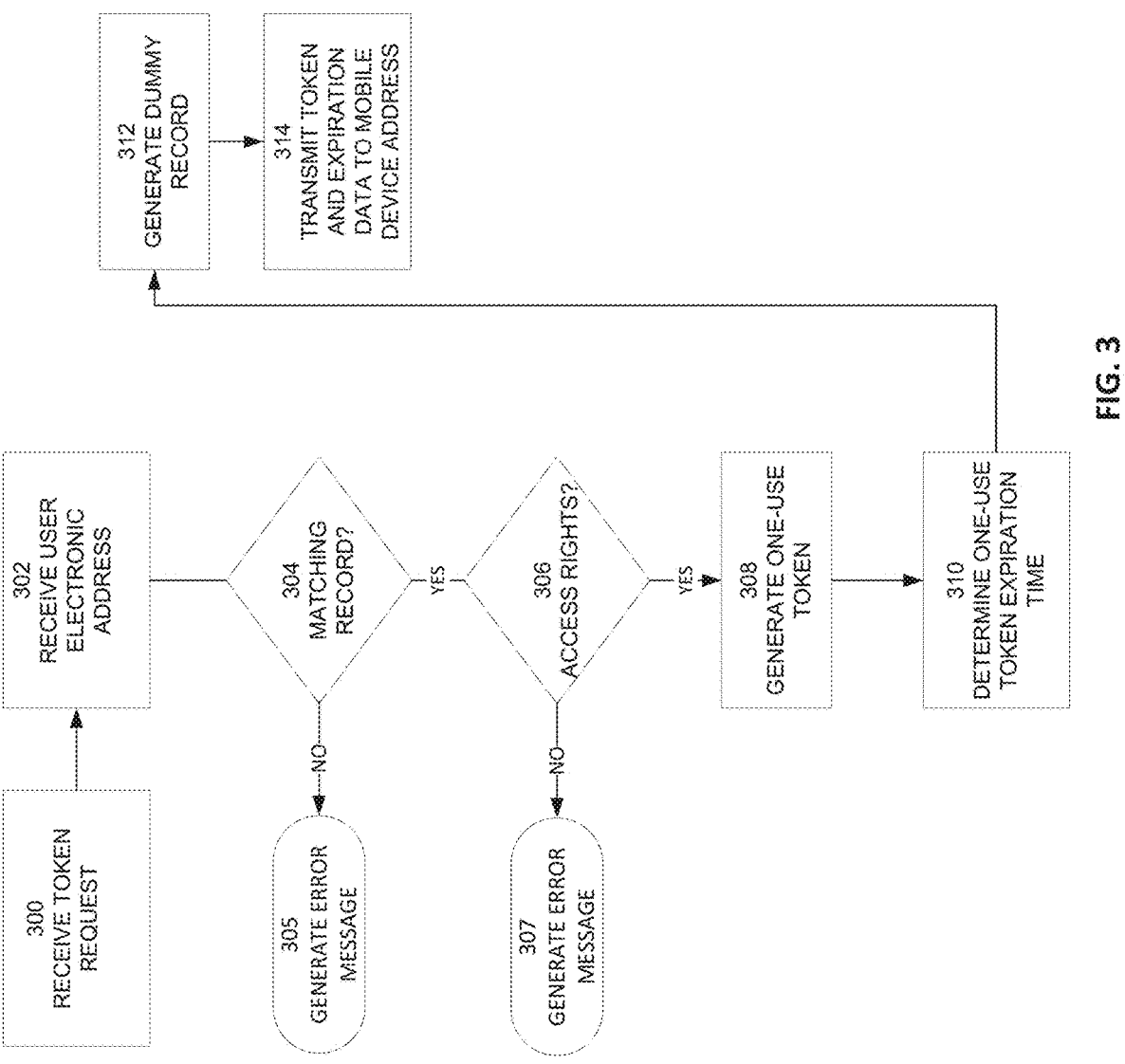
FIG. 3 illustrates an example process.

Referring now to FIG. 3, an example process is illustrated configured to generate a one-use token that mimics a token generated by a credentials application downloaded to, and executed by a user's mobile device. The process may be executed utilizing one or more of the systems disclosed herein.

At block 300, a request for an access token (e.g., a one-use access token) is received from a user at a venue for a ticketed event (e.g., from a user who does have a mobile device with a credentials application downloaded thereto). The request may be received via a control presented by a user interface provided by a computerized kiosk (which may be mounted on a pedestal or counter and which may be useable directly by event attendees) in networked communication with a venue system and/or a remote authentication system, or the request may be received by a service person.

At block 302 an electronic address (e.g., a mobile phone address, other messaging address, an email address, and/or the like) may be received from the user via a user interface presented by a kiosk or by a service person who may then enter it via a computer terminal. The electronic address may be provided by the user in response to a request for the electronic address presented by a user interface via the kiosk or by the service person. The request may specify that the user is to provide an electronic address previously provided by the user when the user acquired (e.g., purchased or otherwise received) a ticket/access right for the ticketed event or that is otherwise associated with a user record of the user.

At block 304, a search may be performed in one or more databases (e.g., a venue system database or a remote authentication system) for a user record associated with the electronic address. If a matching user record is not identified, at block 305, an error message may be generated indicating that a user record corresponding to the electronic address was not located. For example, the error message may be presented via a kiosk display and/or speaker or other computer/computer terminal display and/or speaker. The error message may indicate the reason the error message was triggered (e.g., no user record found that is associated with the electronic address).

If a user record is identified by the database search that is associated with the electronic address, a determination may be made at block 306 as to whether there is an access right (e.g., a ticket) associated with the user record for the ticketed event at the venue. Optionally, in addition, a determination may be made as to whether the user record indicates that the user is entitled to access a restricted area within the event venue in addition to an access right to the ticketed event at the venue. If an access right for the ticketed event at the venue is not associated with the user record, at block 307, an error message may be generated, optionally indicating that the user's account is not associated with an access right for the ticketed event. For example, the error message may be presented via a kiosk display and/or speaker or other computer display and/or speaker.

If an access right for the ticketed event is determined to be associated with the user record, at block 308, a one-use token may be generated, as similarly described elsewhere herein. Thus, optionally, if there is a record for the user that includes a device identifier (e.g., a unique device identifier, such as an IMEI, MEID, ESN, IMSI and/or system assigned identifier, that may be different than and independent of the device phone number) for a device of the user, that device identifier from the user record may be utilized in the optical code. Optionally, if there is a record for the user that includes a user identifier for the user (e.g., a unique user identifier), that user identifier may be utilized in the optical code. In addition, the optical code may optionally include a timestamp (which may be the current time, or the current time plus an additional time so that the timestamp will expire at a later time). Optionally, the device identifier, user identifier, and/or the timestamp may be encrypted (e.g., using one or more of the encryption types described herein).

Optionally, if the actual user identifier and/or the actual device identifier are not available via a user record, the optical code may optionally include a timestamp (which may be the current time, or the current time plus an additional time so that the timestamp will expire at a later time), a unique generated identifier (which may be referred to as a mock mobile device identifier) corresponding to a format (e.g., length, use of permitted characters) of a unique mobile device identifier, even though optionally the unique identifier may not be that of an actual mobile device (or may correspond to a unique identifier of a device that is no longer is use). Similarly, the optical code may optionally include a unique identifier different than an actual user identifier (which may be referred to as a mock user identifier) corresponding to a format (e.g., length, use of permitted characters) of a unique user identifier, even though optionally the unique identifier may not actually be that of a user (or may be a user identifier of a user that no longer has an account with the authentication/ticketing system). For example, the optical code may optionally include a timestamp (which may be the current time, or the current time plus an additional time so that the timestamp will expire at a later time), a mock mobile device identifier, and a mock user identifier. If the credentials application generates an encrypted version of the identifiers and/or timestamp, the mock identifiers and/or timestamp may be similarly encrypted.

Optionally, if it is determined that the user has an access right to a restricted area within the venue for the event, a second optical code may optionally me generated that includes a timestamp (which may be the current time, or the current time plus an additional time so that the timestamp will expire at a later time, where the additional time may be different than that used to gain access to the event venue), a unique generated identifier (which may be referred to as a mock mobile device identifier) corresponding to a format (e.g., length, use of permitted characters) of a unique mobile device identifier, even though optionally the unique identifier may not be that of an actual mobile device (or may correspond to a unique identifier of a device that is no longer is use). Similarly, the second optical code may optionally include a unique identifier different than an actual user identifier (which may be referred to as a mock user identifier) corresponding to a format (e.g., length, use of permitted characters) of a unique user identifier, even though optionally the unique identifier may not actually be that of a user (or may be a user identifier of a user that no longer has an account with the authentication/ticketing system). For example, the second optical code may optionally include a timestamp (which may be the current time, or the current time plus an additional time so that the timestamp will expire at a later time, where the additional time may be different than that used to gain access to the event venue perimeter), a mock mobile device identifier, and a mock user identifier. If the credentials application generates an encrypted version of the identifiers and/or timestamp, the mock identifiers and/or timestamp may be similarly encrypted. The second optical code may be transmitted (e.g., via an SMS/MMS or other message type, via email, or otherwise) to a user device in the same message as the first optical code and/or in a separate message.

As noted above, the timestamp may be the current time plus an additional time so that the timestamp will expire at a later time. The additional time may be determined using the physical distance of the kiosk or service person to a venue entrance having a token reader/scanner located thereby, and the estimated time for a user to traverse that distance. In making the determination (which may be performed using a computer system, such as a system described herein), as to the traversal (e.g., walking) time, the amount of predicted or estimated foot traffic along the route from the kiosk/service person to the token reader/scanner may be taken into account. The additional time may optionally be dynamically set based on real time or near real time (e.g., within a range of 1-5 minutes, 1-10 minutes, or 1-15 minutes) images of the route from which the foot traffic and traversal time may be determined/estimated using a learning engine that can identify the number of people along route from the route image(s). For example, if the estimated traversal time is two minutes, the timestamp may be set to the current time plus the estimated traversal time. Optionally, the additional time may be less than the estimated traversal time (e.g., a percentage of the estimated traversal time), to ensure that by the time the user reaches a token reader/scanner the actual time will be no earlier than the timestamp time. For example, if the estimated traversal is two minutes, the timestamp may be set to the current time plus the 50% of the estimated traversal time, which would be one minute in this example.

As similarly discussed elsewhere herein, advantageously, by having the identifiers mimic those of the "normal" optical codes presented by the credentials app, the authentication system and/or venue reader/scanner can read and interpret the optical code, and determine that the real (or mock) mobile device identifier, the real (or mock) user identifier, and the timecode entitle the user to be provided admission to the venue for the ticketed event, just as if they were presented via the downloaded credentials application. As previously discussed, the generated one-use token barcode optionally is not based on data related to the venue or event (e.g., does not include the venue location, venue name, venue address, event name, seat number, etc.). Thus, the generated one-use token barcode is independent of venue data and event data (and does not include any data identifying the venue or event). However, the one-use token (e.g., the barcode) is not self-generated by a credentials application, downloaded to and hosted on the user device, and is instead generated by a system separate from and independent of the user device.

At block 310, an expiration time for the one-use token is calculated (where after the expiration time the token may no longer be used to gain access to the ticketed event at the venue) by adding the threshold period of time to the time included in the timestamp. For example, if the current time is 12:00 PM, and the one-use token is only good for 15 minutes, the expiration time would be 12:15 PM.

Optionally, if the generated one-use token does not include the actual user identifier and/or mobile device identifier of the user (and hence may not be able to be used to access the actual user record), at block 312, a "dummy" record may be generated and recorded in a database (e.g., by the authentication system and/or a venue system) that indicates that the holder of the one-use token is entitled to admission to the ticketed event. The record may also indicate what seat and/or entrance the user is entitled to utilize. Thus, when the optical code is read, a database lookup will locate the corresponding dummy record, and the user will be verified as having access rights accordingly. Optionally, once the one-use token is utilized, the dummy record may be deleted, thereby reducing memory utilization and preventing the one-use token from being utilized a second time.

At block 314, the generated one-use token is transmitted to the electronic address associated with the access right/ticket acquisition, optionally in association with the expiration time and/or the seat identifier.

Figure 4A:
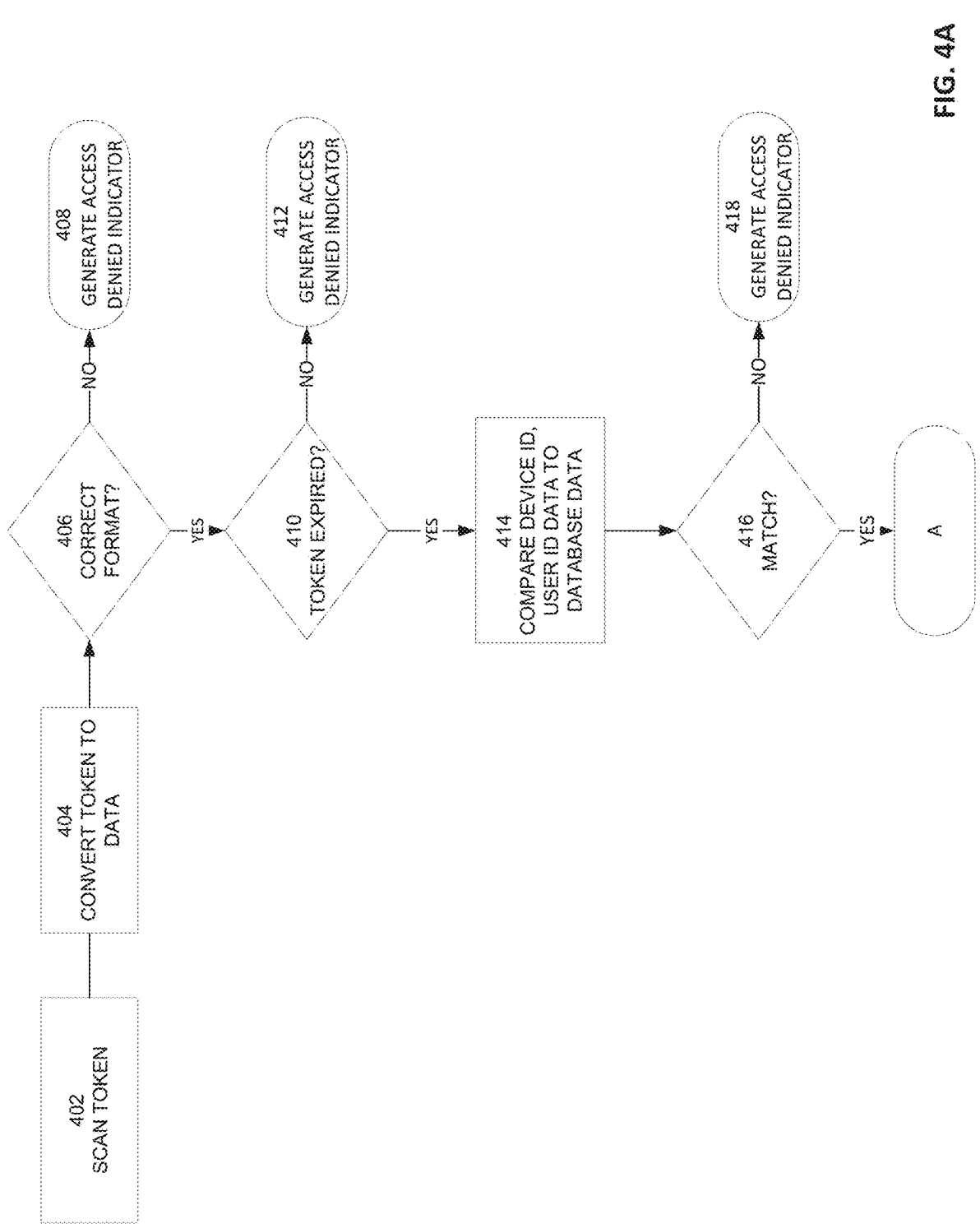
FIGS. 4A-4B illustrate another example process.
Figure 4B:
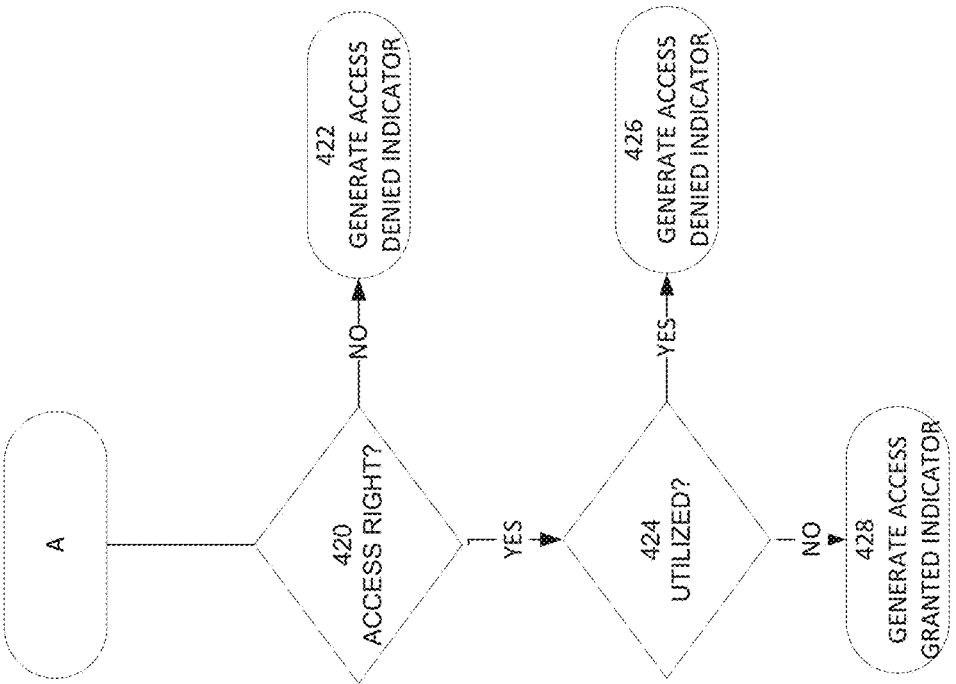

Referring now to FIG. 4A and FIG. 4B, an example process is illustrated, the process configured to identify, using an optical token a person at a venue and to determine whether the identified person has access rights to the venue at the current time (e.g., for a particular event). The process may be performed in whole or in part by a venue system, or in whole or in part by an authentication system or other system, in conjunction with a user device. The same or similar process may be performed at an interior access point at a venue during an event (after the user has gained access to the event venue at a perimeter access point) using the same token or a token generated for the interior access point. However, optionally a determination may be made at the perimeter access point as to whether the user used an access token to gain access to the event venue (e.g., at a perimeter access point). If a determination is made the user used the access token to gain access to the event venue, the user may be denied access to the interior access point.

At block 402, a token (e.g., a one-use access token) presented via a user device may be read/scanned by a venue reader/scanner. For example, the access token may include computer readable optical indicia (e.g., a barcode, such as a QR code that encodes data). At block 404 the token may be converted to data using a decoding and/or decryption process. For example, the barcode may encode a user identifier and/or a device identifier, and/or a timestamp and/or a hash value thereof, which may be decoded. Further, the barcode may include encrypted versions of the foregoing data, which may have been encrypted using a public key and may be decrypted using a private key.

At block 406, a determination may be made as to whether the data includes data corresponding to user identifier (e.g., has the correct format, such as the correct number and type of characters), a device identifier (e.g., has the correct format, such as the correct number and type of characters), or a hash value thereof, and a timestamp.

If the format is determined to be incorrect, at block 408, an access denied indicator may be generated. For example, a corresponding message or command may be transmitted to a device at the event venue entry where the reader/scanner is located indicating the user does not have access authorization. The message or command may cause a corresponding visual and audible indicator to provide a human perceptible pass/fail indication, such as by having a red light illuminate and/or by having an access denied text and/or graphic message displayed on a device. If the format is correct, a mobile device identifier value, a user identifier value, and a timestamp value may be decoded from the token.

At block 410, a determination may be made as to whether the token expired. For example, the reader/scanner or other system may compare the timestamp against the current time and determine whether the timestamp has expired or satisfied (is within) a threshold date/time range (e.g., the current time plus 15 seconds, 30 seconds, 1 minutes, 2 minutes, 3 minutes, 4 minutes, 5 minutes, or other specified time range). By way of illustrative example, an access control system may have the threshold period of time stored in memory and may access the stored threshold period of time from memory, add it to the timestamp, and determine if the current time is earlier than the time in the timestamp plus the threshold period of time. If the current time is earlier than the time in the timestamp plus the threshold period of time, the token may be determined to have expired. Optionally, a determination may be made as to whether the venue reader/scanner is positioned at a perimeter venue access point or at an interior access point, and a corresponding threshold period of time may be accessed from memory.

If the token has expired, at block 412, an access denied/token expired indicator may be generated. For example, a corresponding message or command may be transmitted to a device at the event venue entry where the reader/scanner is located indicating the user does not have authorization and/or that the token has expired. The message or command may cause a corresponding visual and audible indicator to provide a human perceptible pass/fail indication, such as by having a red light illuminate and/or by having an access denied text and/or graphic message displayed on a device.

If a determination is made that the token has not expired, the device identifier and user identifier decoded and/or decrypted from the token (or a hash value or other processed data thereof) is compared to those in a database of user records at block 414 to determine, at block 416, if there is a user record with a matching device identifier and user identifier (or a hash value or other processed data thereof). As discussed elsewhere herein, in certain instances, a dummy record may have been generated and stored in a database that corresponds to a one-use token. Thus, if the token read/scanned at block 402 is a one-use token, it will match the dummy record.

If a matching user record (corresponding to the user identifier and device identifier included in the read/scanned token) is not found, at block 418, an access denied/no record found indicator may be generated. For example, a corresponding message or command may be transmitted to a device at the event venue entry where the reader/scanner is located indicating the user does not have authorization and/or that a matching record has not been found. The message or command may cause a corresponding visual and audible indicator to provide a human perceptible pass/fail indication, such as by having a red light illuminate and/or by having an access denied text and/or graphic message displayed on a device.

If a matching user record (or dummy record) is found, at block 420, a determination may be made as to whether there is an access right (e.g., one or more tickets for one or more attendees) for the ticketed event at the venue associated with the user record (or dummy record).

If an access right is not associated with the user record (or dummy record), at block 422, an access denied/no ticket indicator may be generated. For example, a corresponding message or command may be transmitted to a device at the event venue entry where the reader/scanner is located indicating the user does not have authorization and/or that the user does not have a ticket for the event. The message or command may cause a corresponding visual and audible indicator to provide a human perceptible pass/fail indication, such as by having a red light illuminate and/or by having an access denied text and/or graphic message displayed on a device.

If an access right is associated with the user record (or dummy record), at block 424, a determination is made as to whether the one-use access token has already been utilized (e.g., by accessing a database record associated with the user or the one-use token). If a determination is made that the one-use access token has already been utilized, at block 426, an access denied/no ticket indicator may be generated. For example, a corresponding message or command may be transmitted to a device at the event venue entry where the reader/scanner is located indicating the user does not have authorization and/or that the one-use access token has already been utilized. The message or command may cause a corresponding visual and audible indicator to provide a human perceptible pass/fail indication, such as by having a red light illuminate and/or by having an access denied text and/or graphic message displayed on a device.

If a determination is made that the one-use access token has already been utilized, at block 428, an access granted indicator may be generated. If there is more than one ticket associated with the token, the indicator may indicate the number of tickets. For example, a corresponding message or command may be transmitted to a device at the event venue entry where the reader/scanner is located indicating a specified number of attendees (e.g., the user presenting the token and the number of additional attendees with the user) that have authorization to access the event at the venue. The message or command may cause a corresponding visual and audible indicator to provide a human perceptible pass indication, such as by having a green light illuminate and/or by having an access granted text and/or graphic message displayed on a device. Optionally, an indication that the one-use token has been used to gain access to the event may be stored in association with the user record or a one-use token record to prevent the one-use token from being improperly re-used.

Figure 5:
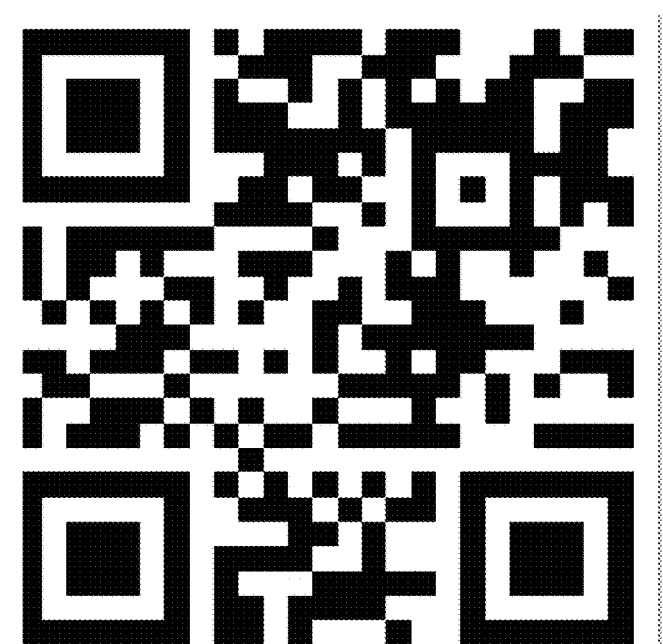
FIG. 5 illustrates an example one-use optical token.

FIG. 5 illustrates an example one-use optical token and associated data. As similarly described elsewhere, the one-use optical token may comprise a QR code encoding an optionally encrypted user identifier, device identifier, and/or timestamp. The QR code may be displayed in association with a seat identifier and an expiration time as similarly described elsewhere herein.

It is understood that although the access token may be referred to as a one-use or single use access token, optionally the access token may be configured to be limited to a threshold number of uses greater than one (e.g., to enable a user bearing the access token to leave and return to the event venue up to a threshold number of times during the event), or the access token may be configured to enable the bearer to access the event venue an unlimited times during the event (e.g., to enable a user bearing the access token to leave and return to the event venue an number of times during the event). Optionally, the access token may be configured to enable access to the event venue an unlimited number of times until the timestamp indicates that the access token has expired.

Thus, methods and systems are described that enable an access token to be transmitted to a user device and utilized to access a location, even in the absence of a credentials application being hosted on the user device.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated phone application, computer application, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, other wearable computing device. etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method of electronically generating a time-limited one-use access token, the method comprising:

receiving, at a computer system from a user at a first venue of a first event, a request, for a one-use optical token;

receiving at the computer system an electronic address from the user at the first venue of the first event, the electronic address purported to be associated with an access right acquired remote from the first venue for the first event at the first venue;

performing a search of a database for a record associated with the electronic address;

at least partly in response to identifying a first record associated with the electronic address, determining if the first record is associated with the access right for the first event;

at least partly in response to determining the first record is associated with the access right for the first event, generating a token comprising a computer readable optical code comprising a device identifier, a user identifier, and a timestamp;

determining an expiration time associated with the token comprising the computer readable optical code comprising the device identifier, the user identifier, and the timestamp, wherein the computer readable optical code does not include a ticket, a venue identifier, or an event identifier;

determining a seat associated with the first record;

while the first user is at the first venue, transmitting, using a messaging service to the electronic address, the expiration time, a seat identifier corresponding to the seat associated with the first record, the token, the token comprising the computer readable optical code comprising the device identifier, the user identifier, and the timestamp, wherein the electronic address is accessible by a first device of the first user;

reading using a first optical reader, from a display of the first device, the token comprising the computer readable optical code comprising the device identifier and the user identifier;

determining whether the device identifier and the user identifier correspond to that in the first record; and at least partly in response to determining that the device identifier and the user identifier correspond to that in the first record, transmitting a command causing an access granted indicator to be presented by a first venue device.

2. The method of claim 1, wherein the first optical reader is located at a perimeter access point, the method further comprising:

reading using a second optical reader, located at an interior access point of the first venue, the token comprising the computer readable optical code comprising the device identifier and the user identifier;

determining whether the device identifier and the user identifier correspond to that in the first record; and at least partly in response to determining that the device identifier and the user identifier correspond to that in the first record, transmitting a command causing an access granted indicator to be presented by a second venue device located at or proximate to the interior access point of the first venue.

3. The method of claim 1, wherein the first optical reader is located at a perimeter access point, the method further comprising:

determining, for a second user associated with a mobile communication device, that a user identifier and/or device identifier are not available from a second user record;

generating a second computer readable optical code comprising:

a second timestamp, a mock mobile identifier having a mobile identifier format different than the mobile identifier of the mobile communication device;

a mock user identifier having a user identifier format;

generating a dummy record comprising the mock mobile identifier and the mock user identifier;

reading using a given venue optical reader, from a display of the mobile communication device associated with the second user, the second computer readable optical code comprising the mock device identifier and the mock user identifier;

determining whether the mock device identifier and the mock user identifier correspond to that in the dummy record; and at least partly in response to determining that the mock device identifier and the mock user identifier correspond to that in the dummy record, transmitting a second command causing a second access granted indicator to be presented by a given venue device.

4. The method of claim 1, wherein the first optical reader is located at a perimeter access point, the method further comprising:

reading using a second optical reader, located at an interior access point of the first venue, a second token comprising a second computer readable optical code comprising a second device identifier and a second user identifier;

determining whether the second token had been read by the first optical reader, wherein the first optical reader is located at the perimeter access point; and at least partly in response to determining that the second token has not been read by the first optical reader, causing an access denied indicator to be presented by a second venue device located at the interior access point of the first venue.

5. The method of claim 1, wherein the token comprising the computer readable optical code comprising the device identifier, the user identifier, and the timestamp further comprises error correction implemented using a Bose-Chaudhuri-Hocquenghem code.

6. The method of claim 1, wherein determining the expiration time associated with the token comprising the computer readable optical code comprising the device identifier, the user identifier, and the timestamp, further comprises:

accessing a first threshold time period from memory; and summing the first threshold time with the timestamp to provide the expiration time.

7. The method of claim 1, the method further comprising:

determining an estimated traversal time from a first location at the first venue to a second location at the first venue; and wherein the timestamp is determined at least partly based on a current time and the estimated traversal time from the first location at the first venue to the second location at the first venue.

8. The method of claim 1, the method further comprising receiving the electronic address from a kiosk having a display and user input device configured to receive identification information comprising an email address and/or a phone number directly from the user.

9. A system, the system comprising:

a computing device; and non-transitory computer readable memory that stores instructions that when executed by the computing device cause the system to perform operations comprising:

receive from a user at a first venue of a first event, a request, for a one-use optical token;

receive an electronic address from the user at the first venue of the first event, the electronic address purported to be associated with an access right acquired remote from the first venue for the first event at the first venue;

perform a search of a data store for a record associated with the electronic address;

at least partly in response to identifying a first record associated with the electronic address, determine if the first record is associated with the access right for the first event;

at least partly in response to determining the first record is associated with the access right for the first event, generate a token comprising a computer readable optical code comprising a device identifier and/or a user identifier, and a timestamp;

determine an expiration time associated with the token comprising the computer readable optical code comprising the device identifier and/or the user identifier, and the timestamp, wherein the computer readable optical code does not include a ticket, a venue identifier, or an event identifier;

while the first user is at the first venue, transmitting to the electronic address, the expiration time, the token, the token comprising the computer readable optical code comprising the device identifier and/or the user identifier, and the timestamp, wherein the electronic address is accessible by a first device of the first user;

read using a first optical reader, from a display of the first device, the token comprising the computer readable optical code comprising the device identifier and/or the user identifier;

determining whether the device identifier and/or the user identifier correspond to that in the first record; and at least partly in response to determining that the device identifier and/or the user identifier correspond to that in the first record, transmit a command causing an access granted indicator to be presented by a first venue device.

10. The system of claim 9, wherein the first optical reader is located at a perimeter access point, the operations further comprising:

reading using a second optical reader, located at an interior access point of the first venue, the token comprising the computer readable optical code comprising the device identifier and the user identifier;

determining whether the device identifier and the user identifier correspond to that in the first record; and at least partly in response to determining that the device identifier and the user identifier correspond to that in the first record, transmitting a command causing an access granted indicator to be presented by a second venue device located at or proximate to the interior access point of the first venue.

11. The system of claim 9, wherein the first optical reader is located at a perimeter access point, the operations further comprising:

determining, for a second user associated with a mobile communication device, that a user identifier and/or device identifier are not available from a second user record;

generating a second computer readable optical code comprising:
a second timestamp,
a mock mobile identifier having a mobile identifier format different than the mobile identifier of the mobile communication device;
a mock user identifier having a user identifier format;

generating a dummy record comprising the mock mobile identifier and the mock user identifier;

reading using a given venue optical reader, from a display of the mobile communication device associated with the second user, the second computer readable optical code comprising the mock device identifier and the mock user identifier;

determining whether the mock device identifier and the mock user identifier correspond to that in the dummy record; and at least partly in response to determining that the mock device identifier and the mock user identifier correspond to that in the dummy record, transmitting a second command causing a second access granted indicator to be presented by a given venue device.

12. The system of claim 9, wherein the first optical reader is located at a perimeter access point, the operations further comprising:

reading using a second optical reader, located at an interior access point of the first venue, a second token comprising a second computer readable optical code comprising a second device identifier and a second user identifier;

determining whether the second token had been read by the first optical reader, wherein the first optical reader is located at the perimeter access point; and at least partly in response to determining that the second token has not been read by the first optical reader, causing an access denied indicator to be presented by a second venue device located at the interior access point of the first venue.

13. The system of claim 9, wherein the token comprising the computer readable optical code comprising the device identifier and/or the user identifier, and the timestamp further comprises error correction implemented using a Bose-Chaudhuri-Hocquenghem code.

14. The system of claim 9, wherein determining the expiration time associated with the token comprising the computer readable optical code comprising the device identifier and/or the user identifier, and the timestamp, further comprises:

accessing a first threshold time period from memory; and summing the first threshold time with the timestamp to provide the expiration time.

15. The system of claim 9, the operations further comprising:

determining an estimated traversal time from a first location at the first venue to a second location at the first venue; and wherein the timestamp is determined at least partly based on a current time and the estimated traversal time from the first location at the first venue to the second location at the first venue.

16. The system of claim 9, wherein the computer system is configured to communicate with a kiosk having a display and user input device configured to receive identification information comprising an email address and/or a phone number directly from the user.

17. Non-transitory computer readable memory that stores instructions that when executed by a computing system cause the computing system to perform operations comprising:

receive from a user at a first venue of a first event, a request, for an optical token;

receive an electronic address from the user at the first venue of the first event, the electronic address purported to be associated with an access right acquired remote from the first venue for the first event at the first venue;

perform a search of a data store for a record associated with the electronic address;

at least partly in response to identifying a first record associated with the electronic address, determine if the first record is associated with the access right for the first event;

at least partly in response to determining the first record is associated with the access right for the first event, generate a token comprising a computer readable optical code comprising a device identifier and/or a user identifier, and a timestamp;

determine expiration information associated with the token comprising the computer readable optical code comprising the device identifier and/or the user identifier, and the timestamp, wherein the computer readable optical code does not include a ticket, a venue identifier, or an event identifier;

while the first user is at the first venue, transmitting, using a messaging service to the electronic address, the expiration information, the token, the token comprising the computer readable optical code comprising the device identifier and/or the user identifier, and the timestamp, wherein the electronic address is accessible by a first device of the first user;

read using a first optical reader, from a display of the first device, the token comprising the computer readable optical code comprising the device identifier and/or the user identifier;

determining whether the device identifier and/or the user identifier correspond to that in the first record; and at least partly in response to determining that the device identifier and/or the user identifier correspond to that in the first record, transmit a command causing an access granted indicator to be presented by a first venue device.

18. The non-transitory computer readable memory of claim 17, wherein the first optical reader is located at a perimeter access point, the operations further comprising:

reading using a second optical reader, located at an interior access point of the first venue, the token comprising the computer readable optical code comprising the device identifier and the user identifier;

determining whether the device identifier and the user identifier correspond to that in the first record; and at least partly in response to determining that the device identifier and the user identifier correspond to that in the first record, transmitting a command causing an access granted indicator to be presented by a second venue device located at or proximate to the interior access point of the first venue.

19. The non-transitory computer readable memory of claim 17, wherein the first optical reader is located at a perimeter access point, the operations further comprising:

determining, for a second user associated with a mobile communication device, that a user identifier and/or device identifier are not available from a second user record;

generating a second computer readable optical code comprising:

a second timestamp, a mock mobile identifier having a mobile identifier format different than the mobile identifier of the mobile communication device;

a mock user identifier having a user identifier format;

generating a dummy record comprising the mock mobile identifier and the mock user identifier;

reading using a given venue optical reader, from a display of the mobile communication device associated with the second user, the second computer readable optical code comprising the mock device identifier and the mock user identifier;

determining whether the mock device identifier and the mock user identifier correspond to that in the dummy record; and at least partly in response to determining that the mock device identifier and the mock user identifier correspond to that in the dummy record, transmitting a second command causing a second access granted indicator to be presented by a given venue device.

20. The non-transitory computer readable memory of claim 17, wherein the first optical reader is located at a perimeter access point, the operations further comprising:

reading using a second optical reader, located at an interior access point of the first venue, a second token comprising a second computer readable optical code comprising a second device identifier and a second user identifier;

determining whether the second token had been read by the first optical reader, wherein the first optical reader is located at the perimeter access point;

at least partly in response to determining that the second token has not been read by the first optical reader, causing an access denied indicator to be presented by a second venue device located at the interior access point of the first venue.

21. The non-transitory computer readable memory of claim 17, wherein the token comprising the computer readable optical code comprising the device identifier and/or the user identifier, and the timestamp further comprises error correction implemented using a Bose-Chaudhuri-Hocquenghem code.

22. The non-transitory computer readable memory of claim 17, wherein determining the expiration information associated with the token comprising the computer readable optical code comprising the device identifier and/or the user identifier, and the timestamp, further comprises:

accessing a first threshold time period from memory; and summing the first threshold time with the timestamp to provide an expiration time.

23. The non-transitory computer readable memory of claim 17, the operations further comprising:

determining an estimated traversal time from a first location at the first venue to a second location at the first venue;

wherein the timestamp is determined at least partly based on a current time and the estimated traversal time from the first location at the first venue to the second location at the first venue.

24. The non-transitory computer readable memory of claim 17, wherein the electronic address is received via a kiosk having a display and user input device configured to receive identification information comprising an email address and/or a phone number directly from the user.

* * * * *